United States Patent [19]
Hirawa

[11] Patent Number: 5,923,823
[45] Date of Patent: Jul. 13, 1999

[54] METHOD AND APPARATUS FOR GENERATING HALFTONE DOTS

[75] Inventor: Takahide Hirawa, Kyoto, Japan

[73] Assignee: Dainippon Screen Mfg. Co., Ltd., Kyoto, Japan

[21] Appl. No.: 08/856,692

[22] Filed: May 15, 1997

Related U.S. Application Data

[30] Foreign Application Priority Data

May 17, 1996 [JP] Japan .................................. 8-148165

[51] Int. Cl.$^6$ ...................................................... H04N 1/40
[52] U.S. Cl. .......................... 395/109; 358/455; 358/457; 358/298; 382/237
[58] Field of Search .................................... 395/109, 101; 358/465, 466, 456, 457, 455, 534, 535, 298; 382/205, 237, 270

[56] References Cited

U.S. PATENT DOCUMENTS

| | | | |
|---|---|---|---|
| 4,736,254 | 4/1988 | Kotera et al. ........................... | 358/457 |
| 5,418,618 | 5/1995 | Kagawa et al. ......................... | 358/298 |
| 5,469,515 | 11/1995 | Lin .......................................... | 382/237 |
| 5,703,692 | 12/1997 | Nguyen ................................... | 358/298 |

FOREIGN PATENT DOCUMENTS 7-264403 of 1995 Japan .

*Primary Examiner*—Thomas D. Lee
*Attorney, Agent, or Firm*—McDermott, Will & Emery

[57] ABSTRACT

The present invention generates a first threshold value constituting a first threshold pattern and a second threshold value constituting a second threshold pattern. The first threshold pattern is to reproduce a relatively large number of tones and is relatively small in size, while the second threshold pattern has a relatively small number of tones and is relatively large in size. An arithmetic operation is carried out on the first threshold value and the second threshold value so as to generate a third threshold value. The third threshold value is compared with an image signal to generate a dot signal representing a halftone dot.

16 Claims, 21 Drawing Sheets

SECOND THRESHOLD PATTERN TP2 (N=4)

| | A | B | C | D | E | F | G | H | | AE | AF |
|---|---|---|---|---|---|---|---|---|---|---|---|
| 1 | 3 | 2 | 1 | 3 | 0 | 3 | 3 | 2 | | 0 | 1 |
| 2 | 1 | 0 | 0 | 2 | 1 | 2 | 1 | 0 | | 3 | 2 |
| 3 | 3 | 2 | 1 | 0 | 2 | 0 | 2 | 0 | | 0 | 1 |
| 4 | 1 | 0 | 3 | 2 | 3 | 1 | 3 | 1 | | 3 | 2 |
| 5 | 2 | 3 | 1 | 2 | 0 | 3 | 2 | 3 | | 3 | 1 |
| 6 | 0 | 1 | 0 | 3 | 1 | 2 | 0 | 1 | | 2 | 0 |
| 7 | 2 | 3 | 2 | 1 | 1 | 0 | 3 | 2 | | 0 | 2 |
| 8 | 1 | 0 | 3 | 0 | 3 | 2 | 1 | 0 | | 1 | 3 |
| 31 | 0 | 1 | 2 | 0 | 2 | 1 | 2 | 3 | | 0 | 3 |
| 32 | 2 | 3 | 3 | 1 | 3 | 0 | 0 | 1 | | 1 | 2 |

SECOND THRESHOLD PATTERN TP2 (N=4)

Fig. 6

DISTRIBUTION OF THIRD THRESHOLD VALUES TP3

|   | A | B | C | D | E | F | G | H | I | J | K | L | M | N | O | P |
|---|---|---|---|---|---|---|---|---|---|---|---|---|---|---|---|---|
| 1 | 251 | 186 | 169 | 123 | 164 | 183 | 219 | 246 | 250 | 184 | 169 | 120 | 166 | 183 | 217 | 247 |
| 2 | 233 | 152 | 128 | 74 | 89 | 106 | 149 | 228 | 235 | 153 | 131 | 74 | 89 | 104 | 148 | 230 |
| 3 | 203 | 98 | 57 | 24 | 42 | 52 | 138 | 212 | 200 | 97 | 59 | 24 | 43 | 54 | 139 | 212 |
| 4 | 193 | 80 | 35 | 2 | 7 | 21 | 71 | 117 | 195 | 82 | 34 | 1 | 5 | 20 | 70 | 117 |
| 5 | 114 | 67 | 17 | 10 | 12 | 39 | 86 | 199 | 114 | 65 | 19 | 10 | 13 | 39 | 87 | 198 |
| 6 | 208 | 141 | 48 | 47 | 29 | 62 | 100 | 205 | 211 | 140 | 48 | 45 | 28 | 62 | 101 | 204 |
| 7 | 226 | 147 | 110 | 93 | 77 | 132 | 159 | 238 | 225 | 144 | 110 | 95 | 77 | 132 | 159 | 237 |
| 8 | 241 | 220 | 179 | 160 | 127 | 174 | 189 | 248 | 242 | 223 | 176 | 161 | 127 | 174 | 190 | 248 |
| 9 | 251 | 185 | 168 | 121 | 165 | 182 | 219 | 246 | 249 | 184 | 170 | 121 | 166 | 181 | 216 | 245 |
| 10 | 234 | 152 | 130 | 75 | 88 | 107 | 148 | 229 | 234 | 155 | 131 | 72 | 91 | 104 | 151 | 230 |
| 11 | 202 | 99 | 58 | 25 | 41 | 52 | 139 | 213 | 202 | 96 | 57 | 24 | 41 | 55 | 136 | 215 |
| 12 | 193 | 80 | 35 | 0 | 6 | 23 | 70 | 116 | 195 | 81 | 34 | 3 | 4 | 22 | 69 | 118 |
| 13 | 113 | 67 | 19 | 10 | 12 | 37 | 86 | 199 | 113 | 64 | 17 | 11 | 15 | 38 | 86 | 196 |
| 14 | 208 | 142 | 49 | 44 | 30 | 63 | 100 | 205 | 211 | 142 | 48 | 46 | 28 | 61 | 103 | 205 |
| 15 | 226 | 147 | 111 | 93 | 76 | 133 | 159 | 238 | 226 | 144 | 111 | 93 | 79 | 133 | 158 | 239 |
| 16 | 241 | 220 | 178 | 160 | 126 | 175 | 188 | 249 | 243 | 221 | 178 | 160 | 126 | 172 | 188 | 249 |

HALFTONE DOTS GENERATED IN RESPONSE TO Im=18

HALFTONE DOTS GENERATED IN RESPONSE TO Im=125

Fig. 9 SECOND THRESHOLD PATTERN TP2' (N=2)

Fig. 10　SECOND THRESHOLD PATTERN TP2'' (N=5)

Fig. 11

MULTI-TONE, LARGE-SIZED THRESHOLD PATTERN Sr

LIT-UP PATTERN BASED ON THRESHOLD PATTERN Sr

Im=64, DOT% =25

LIT-UP PATTERN BASED ON THRESHOLD PATTERN Sr

Im=192, DOT% =75

FIRST EMBODIMENT

FOURTH EMBODIMENT

HALFTONE DOTS GENERATED IN FOURTH EMBODIMENT

METHOD AND APPARATUS FOR GENERATING HALFTONE DOTS

BACKGROUND OF THE INVENTION

1. Field of the Invention

The present invention relates to a technique of generating halftone dots in response to an image signal, and more particularly, to improvement of tone reproduction of halftone images.

2. Description of the Related Art

Binary dot signals representing halftone dots are typically obtained by comparing an image signal with a threshold pattern. The threshold pattern may also be referred to as 'threshold matrix'. A threshold pattern is generally prepared to cover an area in which a single halftone dot is to be formed. In this case, the number of reproducible tones in a halftone image is smaller by one than the number of pixels included in the threshold pattern at the maximum. This is also smaller by one than the number of pixels included in a one-dot area in which a single halftone dot is to be formed.

Recently there has been a strong demand for high-speed output processing of images, and thus for production of halftone dots of a certain screen ruling at a lower resolution. This leads to reduction of the number of pixels included in a one-dot area. Reduction of the number of pixels included in a one-dot area, however, undesirably lowers the number of tones reproducible by one halftone dot.

SUMMARY OF THE INVENTION

One object of the present invention is thus to provide a technique of preparing a halftone image having a relatively large number of reproducible tones even when the number of pixels included in a one-dot area is relatively small.

Another object of the present invention is to generate a halftone image having smooth tone reproducibility.

The present invention is directed to a method of generating halftone dots as a function of an image signal. The method comprises the steps of: (a) providing a first threshold value constituting a first threshold pattern that is to reproduce a relatively large number of tones and is relatively small in size; (b) providing a second threshold value constituting a second threshold pattern that is to reproduce a relatively small number of tones and is relatively large in size; (c) carrying out an arithmetic operation of the first threshold value and the second threshold value, to thereby generate a third threshold value; and (d) comparing the third threshold value with the image signal, to thereby generate a dot signal representing a halftone dot.

The third threshold value is generated from the relatively small-sized first threshold pattern and the relatively large-sized second threshold pattern. By making the relatively small-sized first threshold pattern to correspond to a single one-dot area, a halftone image is reproducible in a relatively large number of tones even when the number of pixels included in the one-dot area is relatively small.

In a preferred embodiment, the step (c) comprises the step of: carrying out an interpolating operation to interpolate the first threshold value with the second threshold value.

The step of carrying out an interpolating may comprise the steps of: multiplying the first threshold value by an integer N; and adding the result of the multiplication and the second threshold value to generate the third threshold value.

Preferably, the second threshold pattern consists of N pieces of threshold elements of 0 to (N−1).

The second threshold pattern is obtained by arranging at random a plurality of different two-dimensional matrices each including an identical set of threshold elements which are arranged in different ways. This structure enhances the spatial frequency of the second threshold pattern and thereby the spatial frequency of the pattern of the third threshold values.

In a preferred embodiment, the integer N is equal to 4, and each the two-dimensional matrix is a 2×2 matrix comprising four threshold elements of 0 to 3.

The threshold elements 0 and 1 may be arranged diagonally and the threshold elements 2 and 3 may be also arranged diagonally in each the 2×2 matrix.

The present invention is also directed to an apparatus for generating halftone dots as a function of an image signal. The apparatus comprises: means for providing a first threshold value constituting a first threshold pattern that is to reproduce a relatively large number of tones and is relatively small in size; means for providing a second threshold value constituting a second threshold pattern that is to reproduce a relatively small number of tones and is relatively large in size; operation means for carrying out an arithmetic operation of the first threshold value and the second threshold value, to thereby generate a third threshold value; and a comparator for comparing the third threshold value with the image signal, to thereby generate a dot signal representing a halftone dot.

The present invention is also directed to a computer program product comprising a computer readable medium and computer program code means stored on said computer readable medium, for generating halftone dots as a function of an image signal. The program code means comprising: program code means for causing a computer to provide a first threshold value constituting a first threshold pattern that is to reproduce a relatively large number of tones and is relatively small in size; program code means for causing the computer to provide a second threshold value constituting a second threshold pattern that is to reproduce a relatively small number of tones and is relatively large in size; program code means for causing the computer to carry out an arithmetic operation of the first threshold value and the second threshold value, to thereby generate a third threshold value; and program code means for causing the computer to compare the third threshold value with the image signal, to thereby generate a dot signal representing a halftone dot.

These and other objects, features, aspects, and advantages of the present invention will become more apparent from the following detailed description of the preferred embodiments with the accompanying drawings.

BRIEF DESCRIPTION OF THE DRAWINGS

FIG. 4 shows the entirety of the second threshold pattern TP2;

FIG. 6 shows a distribution of a third threshold values TP3;

FIG. 9 shows a second threshold pattern TP2' in case that the number of interpolating tones N is equal to 2;

FIG. 10 shows a second threshold pattern TP2" in case that the number of interpolating tones N is equal to 5;

FIG. 11 shows a multi-tone, large-sized threshold pattern Sr used in a preferred method of preparing the second threshold pattern TP2;

DESCRIPTION OF THE PREFERRED EMBODIMENT

A. Outline of the Embodiment

Figure 1:
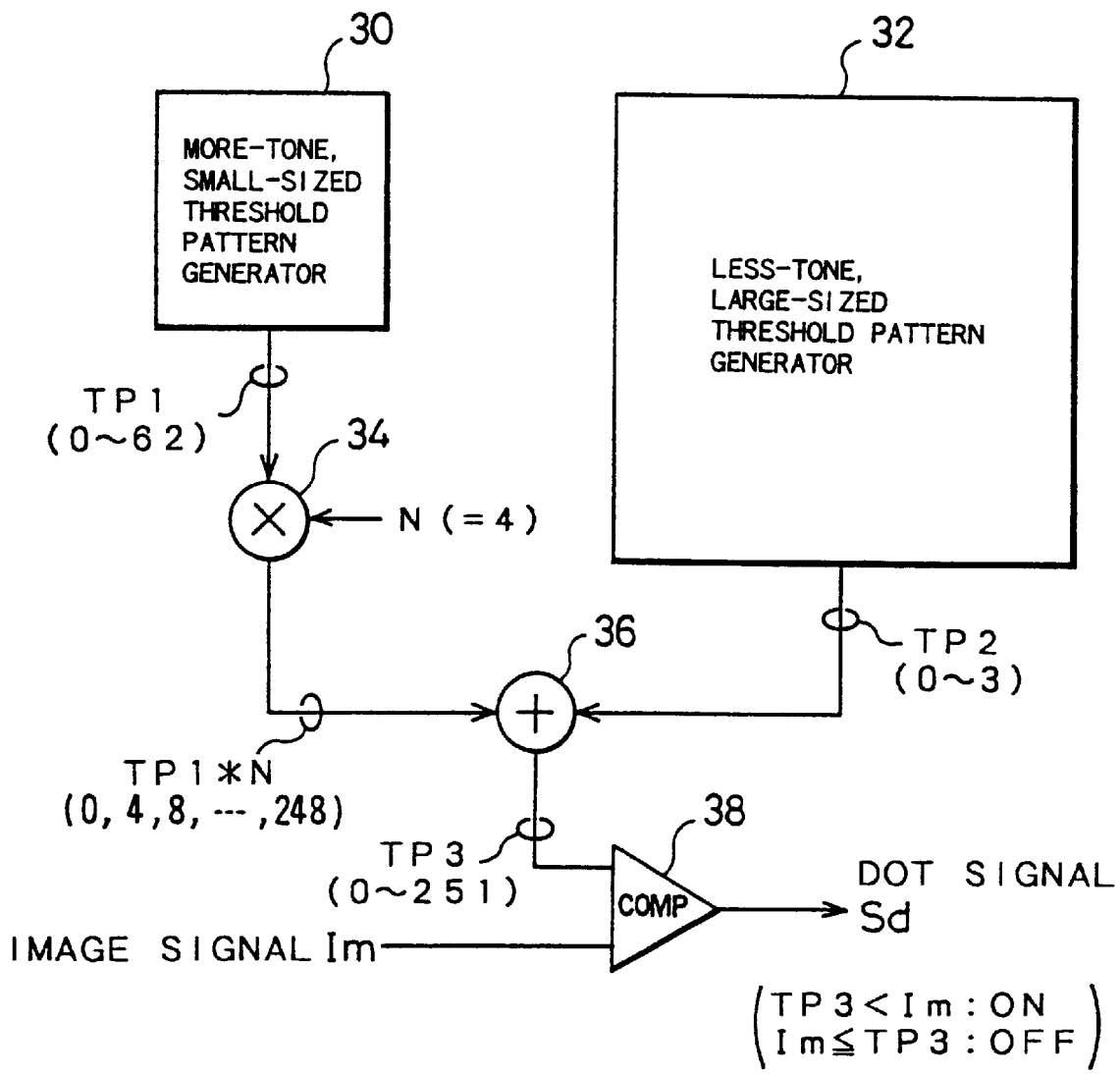
FIG. 1 schematically illustrates the structure of a dot generator embodying the present invention.

The following describes a best mode of carrying out the present invention. FIG. 1 schematically illustrates the structure of a dot generator embodying the present invention. The dot generator includes a first threshold value generator 30, a second threshold value generator 32, a multiplier 34, an adder 36, and a comparator 38. The first threshold value generator 30 generates a first threshold pattern that has a relatively large number of reproducible tones and is relatively small in size. The second threshold value generator 32 generates a second threshold pattern that has a relatively small number of reproducible tones and is relatively large in size. The multiplier 34 multiplies a first threshold value TP1 generated by the first threshold value generator 30 by a positive integer N, which will be hereinafter referred to as the number of interpolating tones. The adder 36 adds a second threshold value TP2 generated by the second threshold value generator 32 to the result of the multiplication TP1×N, thereby generating a third threshold value TP3. The comparator 38 compares the third threshold value TP3 with an image signal Im to generate a binary dot signal Sd representing halftone dots in a halftone dot image.

The level of the dot signal Sd is, for example, defined as:

H level (or exposure or ON) when TP3<Im; and

L level (or non-exposure or OFF) when Im≦TP3.

The multiplier 34 and the adder 36 achieve the functions corresponding to the threshold value operation means of the claimed invention. The threshold value operation means may have another structure, for example, for carrying out operations other than the fundamental arithmetic operations.

The functions of the respective elements shown in FIG. 1 may be achieved by hardware circuitry or alternatively by computer programs executed by a computer system. Such computer programs may be transferred from a portable storage medium such as floppy disks and CD-ROMs, to a main memory of the computer system or an external storage device. Alternatively the computer programs may be supplied from a program supplier apparatus to the computer via a communication line.

Figure 2:
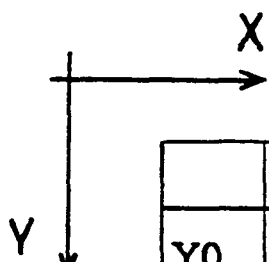
FIG. 2 shows an example of a first threshold pattern generated by a first threshold value generator 30.

FIG. 2 shows an example of the first threshold pattern TP1 generated by the first threshold value generator 30. The first threshold pattern TP1 has the size of 8×8 pixels and includes threshold values TP1 in the range of 0 to 62. The area occupied by the first threshold pattern TP1 is equivalent to a single one-dot area. The level of the dot signal Sd is determined according to the inequalities given above. With the first threshold pattern TP1, the dot signals Sd are all in L level when the image signal Im is equal to zero and all in H level when the image signal Im is equal to 63. The number of tones reproducible by the first threshold pattern TP1 is accordingly equal to 64. The first threshold pattern TP1 has a square shape defined by sides parallel to a main scanning direction Y and a sub-scanning direction X, and a screen angle thereof is equal to 0°.

Figures 3, 5:
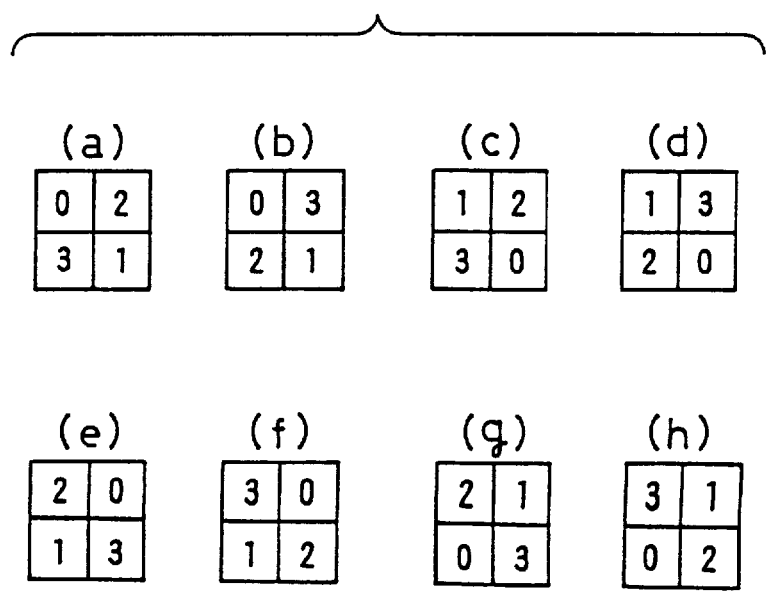
FIG. 3 shows a part of a second threshold pattern TP2 generated by a second threshold value generator 32.
FIG. 5 shows eight preferable 2×2 matrices.
Figure 4:
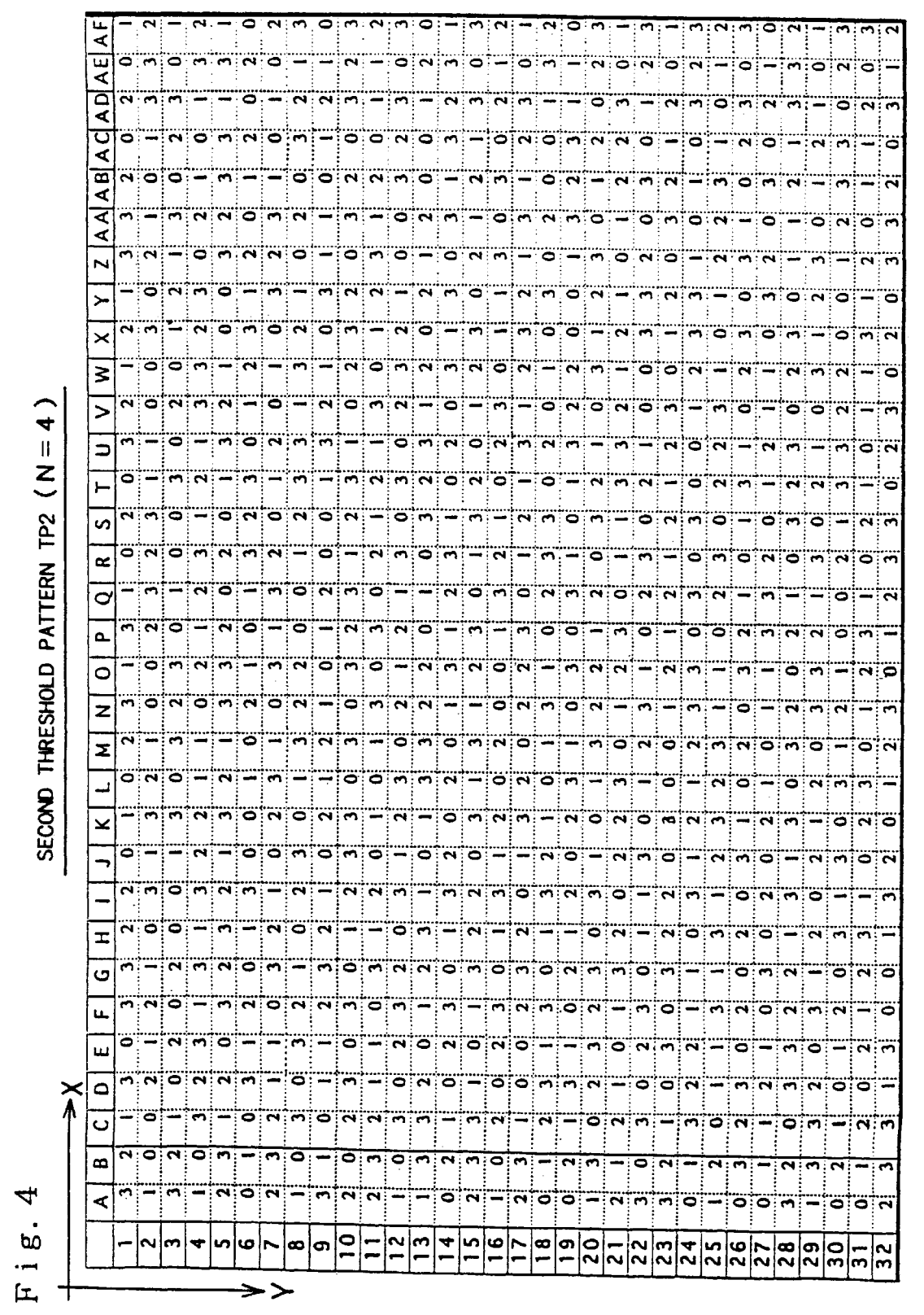

FIG. 3 shows a part of a second threshold pattern TP2 generated by the second threshold value generator 32. The second threshold pattern TP2 has the size of 32×32 pixels, which corresponds to the size of 4×4 one-dot areas. The coordinate in the sub-scanning direction X is expressed by the hexavigesimal number system of A to Z, wherein 'AF' represents 32 in the decimal number system. It is generally preferable that the second threshold pattern TP2 includes several tens to several hundreds of one-dot areas. FIG. 4 shows the entirety of the second threshold pattern TP2, where the interpolating number N is equal to 4.

Referring to FIG. 3, the second threshold pattern TP2 is structured y arranging blocks of 2×2 matrices each including four threshold elements of 0 to 3 at random. There are 24 possible combinations to arrange the threshold elements of 0 to 3 in a single 2×2 matrix. The second threshold pattern TP2 as shown in FIGS. 3 and 4 is prepared by arranging the 2×2 matrices selected at random among the twenty-four different 2×2 matrices.

FIG. 5 shows eight different 2×2 matrices preferably used herein. In these preferable 2×2 matrices, the threshold elements of '0' and '1' are arranged diagonally, and the threshold elements of '2' and '3' are also arranged diagonally. Such 2×2 matrices enhance the spatial frequency of the lit-up pixels or filled pixels of halftone dots, thereby enabling the details of an image to be reproduced more faithfully.

Another preferable method of preparing the second threshold pattern TP2 will be described later.

Referring back to FIG. 1, the multiplier 34 multiplies each threshold value in the first threshold pattern TP1 by N. In this embodiment, it is assumed that N=4. It is preferable that the number of interpolating tones N is set equal to the number of threshold elements constituting the second threshold pattern TP2, which number is four in the example of FIGS. 3 and 4. In the first threshold pattern TP1 shown in FIG. 2, the threshold values TP1 range from 0 to 62. The results of multiplication (TP1×N) output from the multiplier 34 will make skipping values as 0, 4, 8, . . . , 248. The results of the multiplication are then added to the threshold elements included in the second threshold pattern TP2 to yield the third threshold values TP3. In case that the second threshold pattern TP2 consists of the four threshold elements of 0 to 3, the second threshold pattern TP2 can smoothly interpolate the first threshold pattern TP1 so as to generate the third threshold values TP3 without any skips.

FIG. 6 shows a distribution of the third threshold values TP3 (third threshold pattern), wherein only the area of 16×16 pixels is illustrated. Since the threshold values TP2 included in the second threshold pattern TP2 shown in FIG. 3 range from 0 to 3, the third threshold values TP3 obtained as the results of the addition are values of 0, 1, 2, . . . , 251. When the image signal Im has the level of 0 to 255, the halftone dots of 253 tones can be reproduced in response to the dot signals Sd output from the comparator 38. The third threshold values TP3 do not have any skips but take consecutive integers in the range of 0 to 251, thereby enabling smooth reproduction of the tones with the halftone dots.

The third threshold values TP3 are required to include the values in the range of 0 to 254, in order to generate the halftone dots of 256 tones. Even when the number of reproducible tones is 253, any substantial problems can be avoided by appropriately presetting a tone correction curve with respect to the image signals.

If the first threshold pattern TP1 has values in the range of 0 to 63, instead of 0 to 62 as shown in FIG. 2, the resulting third threshold values TP3 would range from 0 to 255. The appropriate range of the threshold values is, however, 0 to 254, in order to reproduce 256 tones for the image signal ranging from 0 to 255. In such a case, it is preferable that a clipping unit is interposed between the adder 36 and the comparator 38 for converting the threshold value of '255' to another value of not greater than 254. This clipping procedure gives the threshold values TP3 in the range of 0 to 254, thus enabling reproduction of 256 tones.

Figure 7:
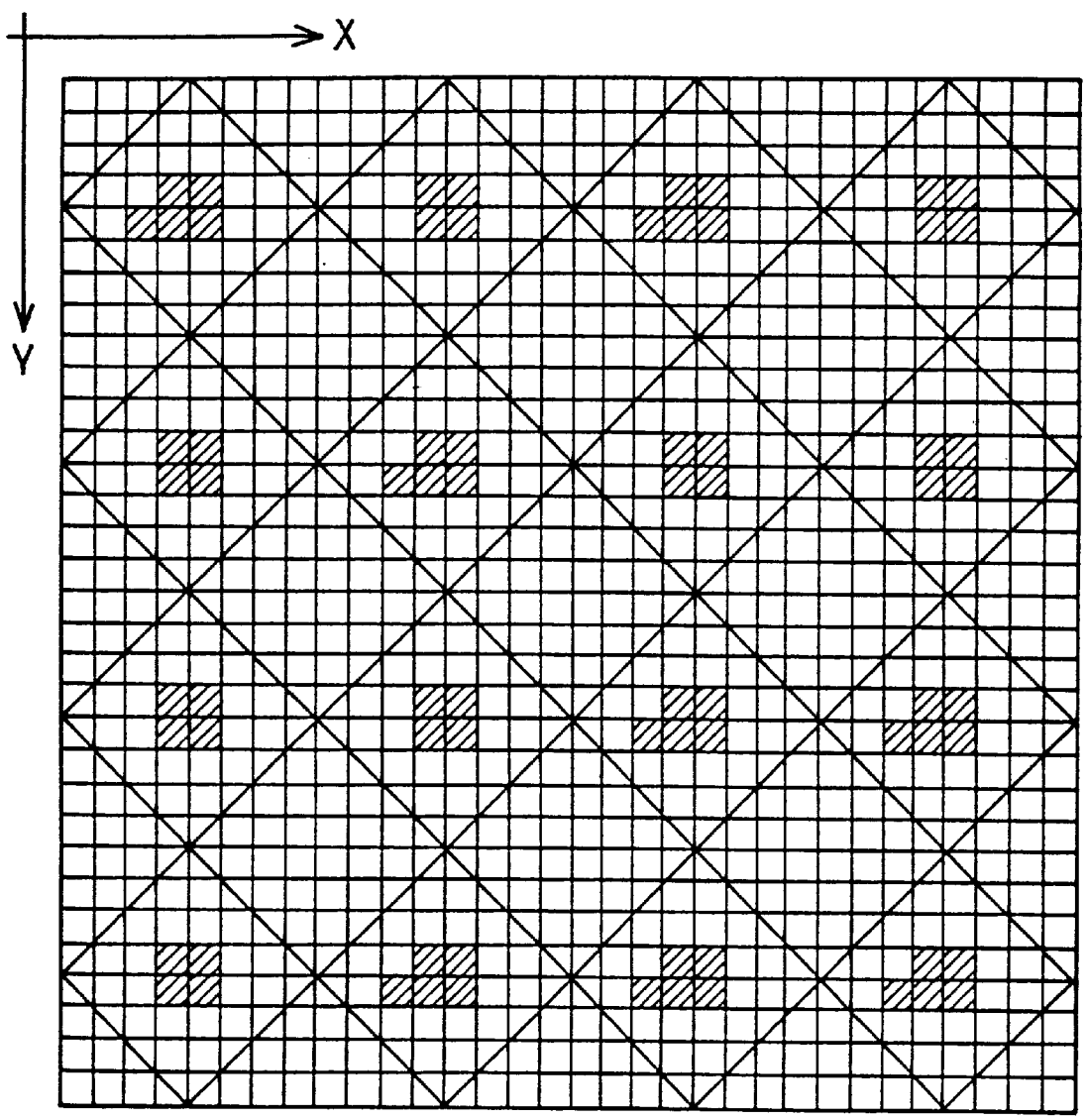
FIG. 7 shows halftone dots generated in response to the image signal Im=18.
Figure 8:
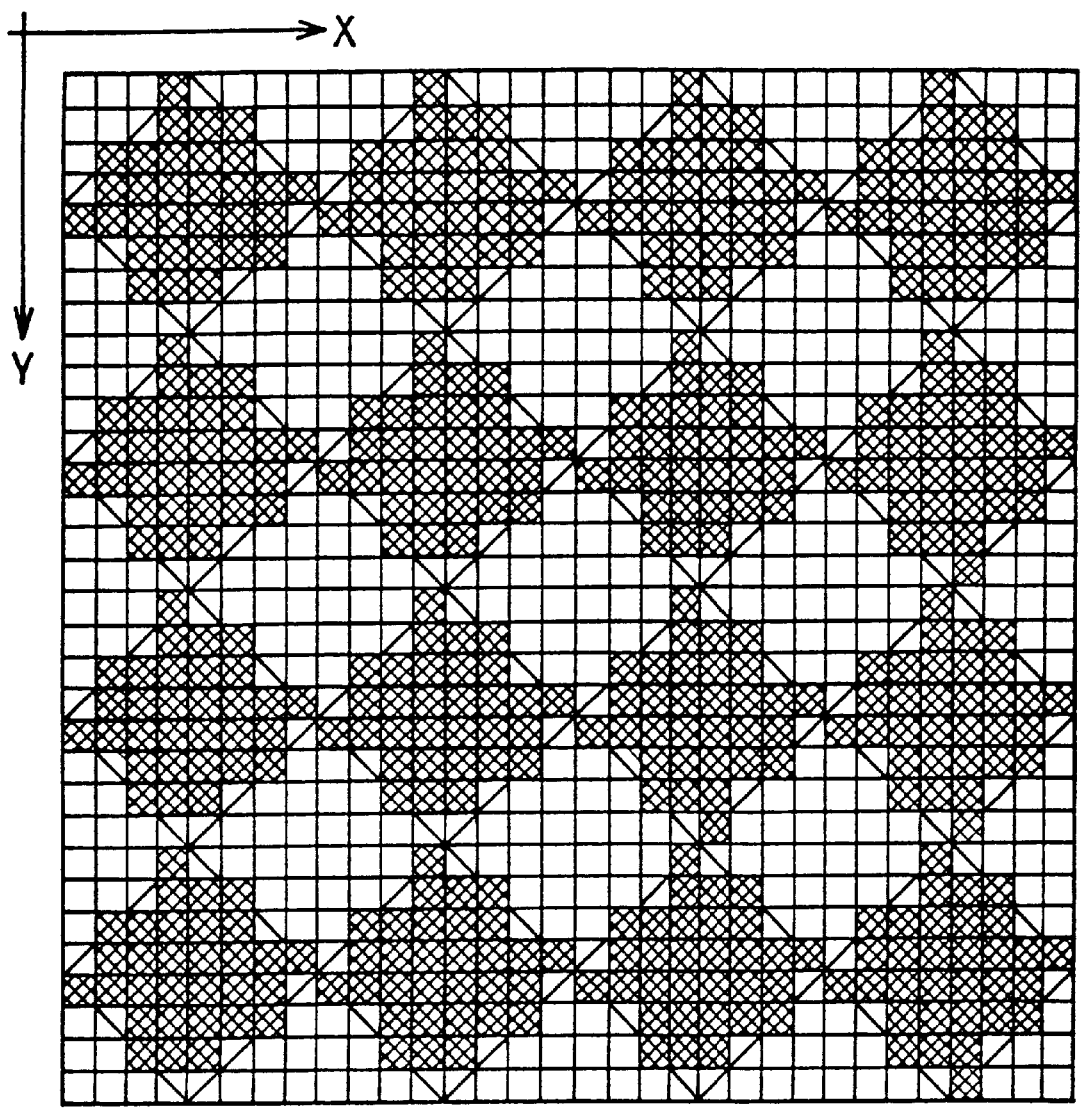
FIG. 8 shows halftone dots generated in response to an image signal Im=125.

FIG. 7 shows halftone dots generated in response to the image signal Im=18 using the threshold patterns TP1 and TP2 shown in FIGS. 2 and 4. FIG. 8 shows halftone dots generated in response to the image signal Im=125. As clearly understood from these drawings, the respective halftone dots do not have an identical shape but may include different numbers of pixels. By utilizing these differences, 254 tones can be reproduced with a plurality of halftone dots such as 4×4=16 halftone dots shown in FIG. 8.

Figure 9:
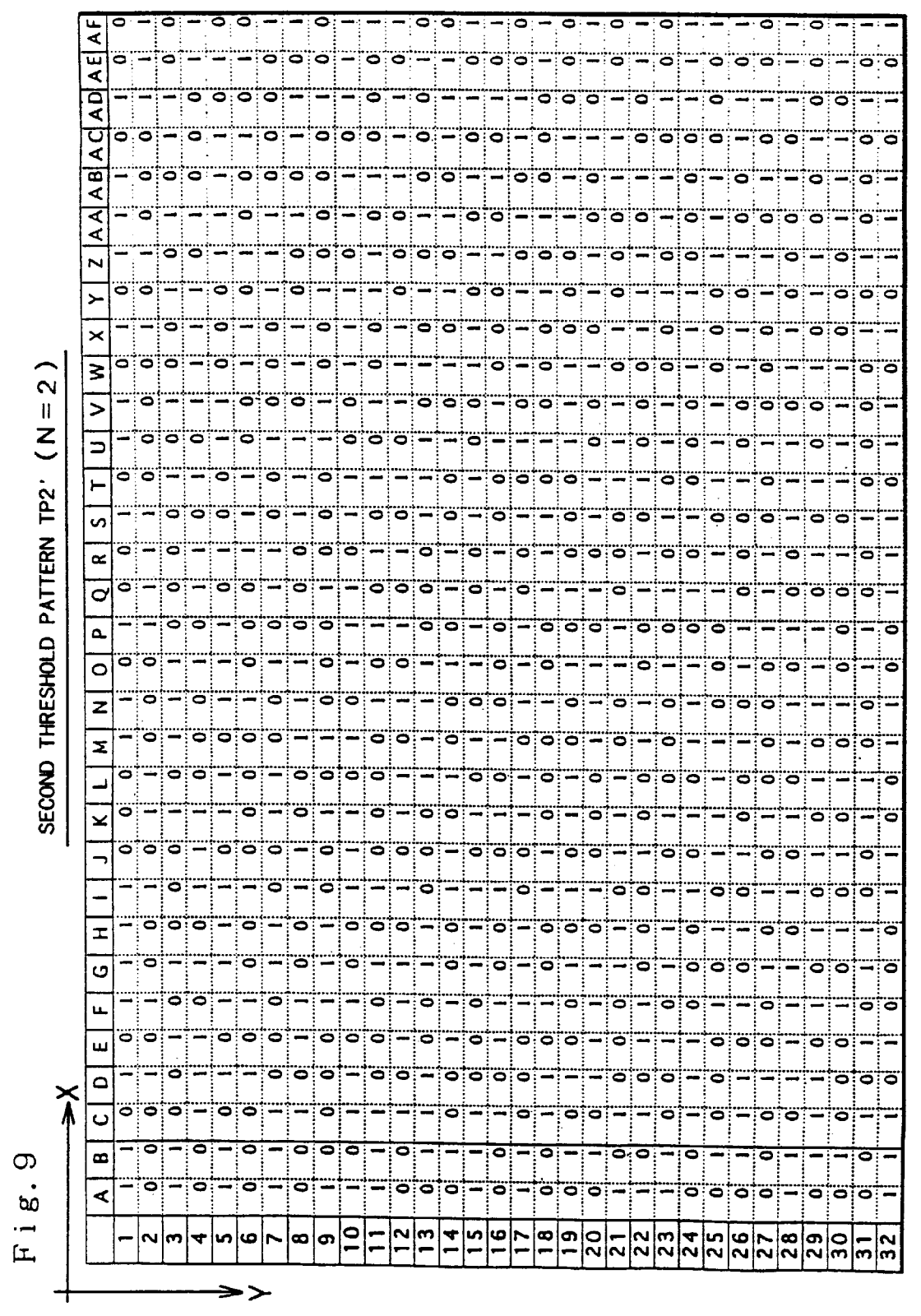

FIG. 9 shows a second threshold pattern TP2' which is used when the number of interpolating tones N is equal to 2. The second threshold pattern TP2' consists of two threshold elements of 0 and 1. The second threshold pattern TP2' shown in FIG. 9 is specifically equivalent to a pattern of upper bits when each threshold element in the threshold pattern shown in FIG. 4 is expressed as 2-bit data. When the number of interpolating tones N in FIG. 1 is set equal to 2, the third threshold values TP3 obtained from the second threshold pattern TP2' and the first threshold pattern TP1 shown in FIG. 2 are in a range of 0 to 125. This enables generation of a halftone image of 127 reproducible tones.

Figure 10:
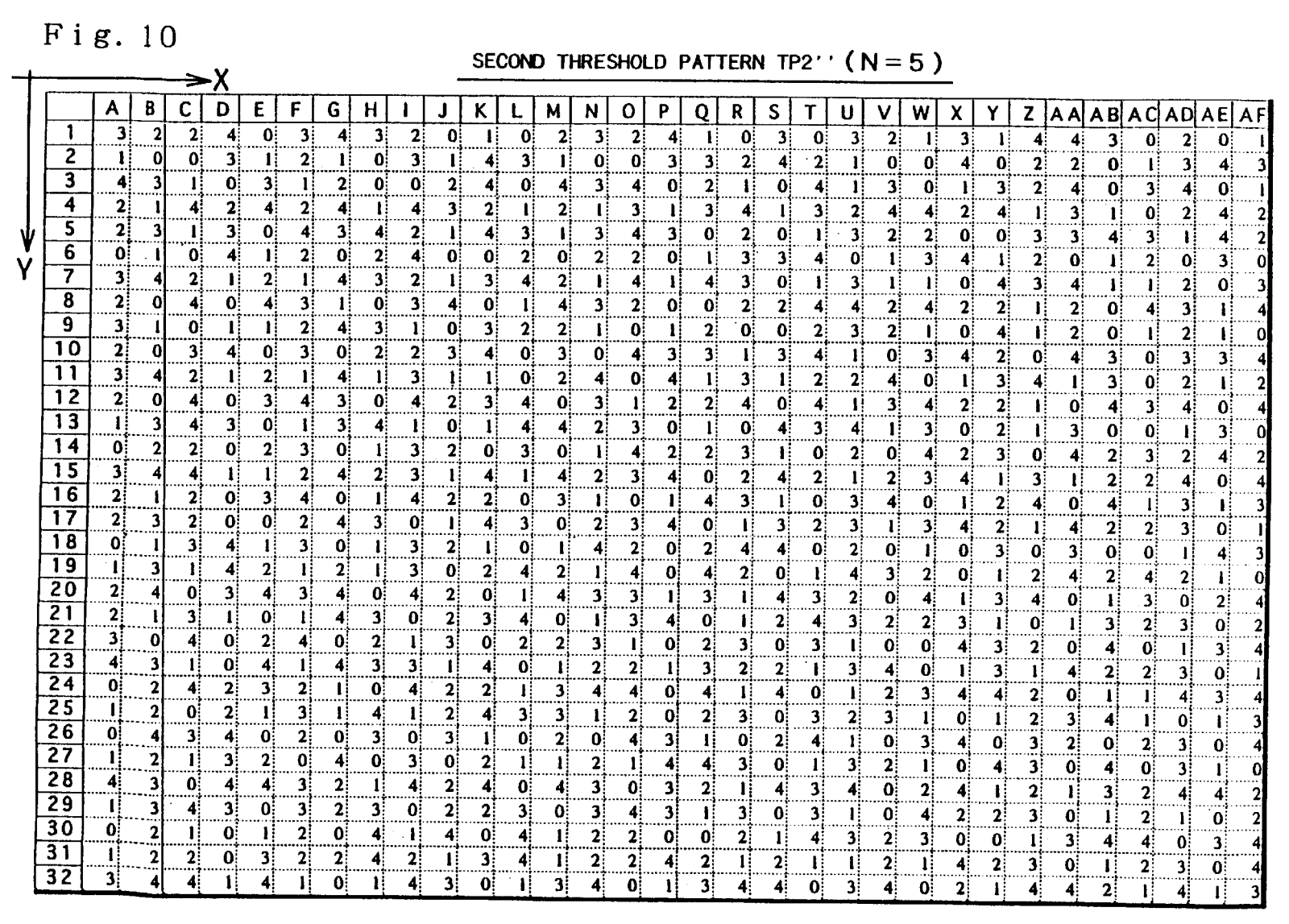

FIG. 10 shows a second threshold pattern TP2" which is used when the number of interpolating tones N is equal to 5. The second threshold pattern TP2" consists of five threshold elements of 0 to 4. When the number of interpolating tones N in FIG. 1 is set equal to 5, the third threshold values TP3 obtained from the second threshold pattern TP2" and the first threshold pattern TP1 shown in FIG. 2 are in a range of 0 to 314. This enables generation of a halftone image of 316 reproducible tones.

As clearly understood from these examples, it is preferable that the number of interpolating tones N is set equal to the number of threshold elements constituting the second threshold pattern TP2. This enables generation of a halftone image of (L×N+1) reproducible tones while using the first threshold pattern TP1 consisting of L threshold elements in a range of 0 to (L−1).

B. Preferable Method of Preparing Second Threshold Pattern TP2

Figure 11:
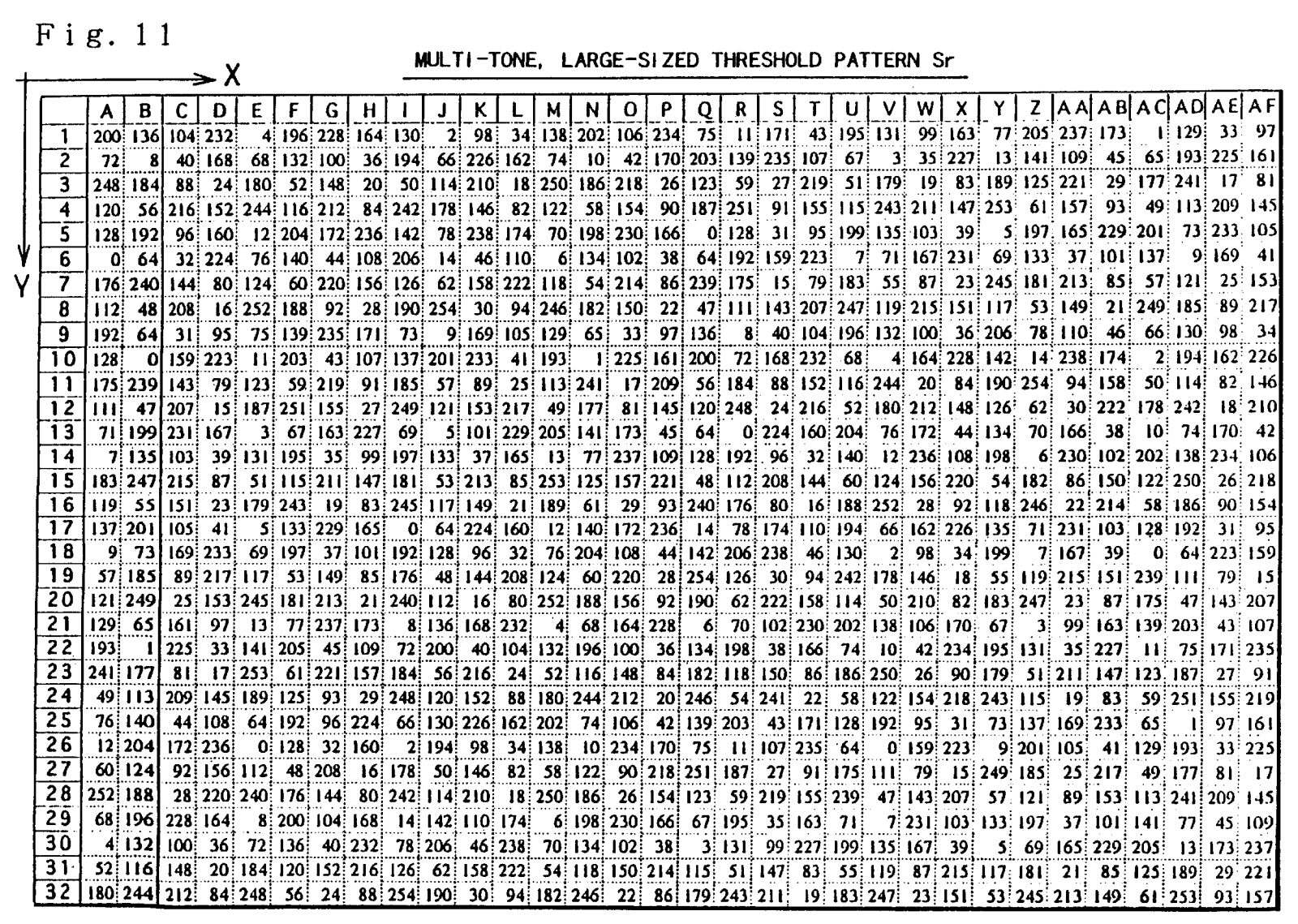

FIG. 11 shows a multi-tone, large-sized threshold pattern Sr used in a more preferable method of preparing the second threshold pattern TP2. The multi-tone, large-sized threshold pattern Sr has the same size as that of the second threshold pattern TP2. Although the threshold pattern Sr includes threshold elements in the range of 0 to 254 in the example of FIG. 11, the range of threshold elements can be set arbitrarily.

The threshold pattern Sr shown in FIG. 11 is prepared according to the method disclosed in a co-pending, commonly owned U.S. patent application Ser. No. 08/382,101, filed on Feb. 1, 1995, the disclosure of which is herein incorporated by reference.

The threshold pattern matrix Sr is prepared by: dividing an area of an M×M threshold matrix, wherein M is an integer of $2^N$ and N is an integer of at least 2, into a plurality of sub-matrices each having an identical size; setting a difference between a plurality of threshold values included in each sub-matrix equal to a predetermined value; and arranging the plurality of threshold values at random in each sub-matrix. The arrangement of the threshold values in each 2×2 sub-matrix Tij included in the M×M matrix, wherein i and j represent coordinates of the 2×2 sub-matrix Tij in the M×M matrix, is determined according to the definition given below, while the combination of integers aij, bij, cij, and dij at each coordinates (i,j) is determined at random:

$$T_{ij} = 2^{2(N-1)} \begin{bmatrix} a_{ij} & c_{ij} \\ d_{ij} & b_{ij} \end{bmatrix} + k_{ij} \begin{bmatrix} 1 & 1 \\ 1 & 1 \end{bmatrix}$$

where i and j respectively represent coordinates of the 2×2 sub-matrix $T_{ij}$ in the M×M matrix, and i and j are integers between 1 and M/2;

$k_{ij}$ is an integer between 0 and $$\left(\frac{M^2}{4} - 1\right),$$

which has a different value for a different combination of i and j, and which is so determined that a value of MOD($k_{ij}$, GN) is identical for four 2×2 sub-matrices $T_{ij}$ included in each 4×4 sub-matrix;

MOD(x,y) gives a remainder of x divided by y;

GN is a number of 4×4 sub-matrices included in the M×M matrix, and is equal to $$\frac{M^2}{4 \times 4};$$

and elements $a_{ij}$, $b_{ij}$, $c_{ij}$, and $d_{ij}$ are different integers between 0 and 3, allocation of the elements $a_{ij}$, $b_{ij}$, $c_{ij}$, and $d_{ij}$ to 0 through 3 is determined independently for each 2×2 sub-matrix $T_{ij}$ at random.

Alternatively the M×M threshold matrix $TM_{M \times M}$ may be defined as follows:

$$TM_{M \times M} = S^N_{(1,1)} = \begin{bmatrix} S^{(N-1)}_{(1,1)} & S^{(N-1)}_{(2,1)} \\ S^{(N-1)}_{(1,2)} & S^{(N-1)}_{(2,2)} \end{bmatrix} + 2^0 \begin{bmatrix} E(a)^{(N-1)} & E(c)^{(N-1)} \\ E(d)^{(N-1)} & E(b)^{(N-1)} \end{bmatrix}_{(1,1)}$$

-continued $$S_{(u,v)}^{(N-1)} = \begin{bmatrix} S_{(1,1)}^{(N-2)} & S_{(2,1)}^{(N-2)} \\ S_{(1,2)}^{(N-2)} & S_{(2,2)}^{(N-2)} \end{bmatrix} + 2^2 \begin{bmatrix} E(a)^{(N-2)} & E(c)^{(N-2)} \\ E(d)^{(N-2)} & E(b)^{(N-2)} \end{bmatrix}_{(u,v)}$$

...

$$S_{(u,v)}^{2} = \begin{bmatrix} S_{(1,1)}^{1} & S_{(2,1)}^{1} \\ S_{(1,2)}^{1} & S_{(2,2)}^{1} \end{bmatrix} + 2^{2(N-2)} \begin{bmatrix} E(a)^{1} & E(c)^{1} \\ E(d)^{1} & E(b)^{1} \end{bmatrix}_{(u,v)}$$

$$S_{(u,v)}^{1} = \begin{bmatrix} S_{(1,1)}^{0} & S_{(2,1)}^{0} \\ S_{(1,2)}^{0} & S_{(2,2)}^{0} \end{bmatrix} + 2^{2(N-1)} \begin{bmatrix} E(a)^{0} & E(c)^{0} \\ E(d)^{0} & E(b)^{0} \end{bmatrix}_{(u,v)}$$

$$S_{(u,v)}^{0} = 0$$

where $S_{(u,v)}^{n}$ is a square matrix of a dimension of $2^n$, given by $$S_{(u,v)}^{n} = \begin{bmatrix} S_{(1,1)}^{(n-1)} & S_{(2,1)}^{(n-1)} \\ S_{(1,2)}^{(n-1)} & S_{(2,2)}^{(n-1)} \end{bmatrix} + 2^{2(N-n)} \begin{bmatrix} E(a)^{(n-1)} & E(c)^{(n-1)} \\ E(d)^{(n-1)} & E(b)^{(n-1)} \end{bmatrix}_{(u,v)}$$

and where n is an integer between 1 and N; $E(a)^{(n-1)}$, $E(b)^{(n-1)}$, $E(c)^{(n-1)}$, and $E(d)^{(n-1)}$ are square matrices of a dimension of $2^{(n-1)}$, whose components are all a, b, c, and d, respectively; the components a, b, c, and d are different integers between 0 and 3, and allocation of the components a, b, c, and d to 0 through 3 is independently determined for each coefficient matrix $$\begin{bmatrix} E(a)^{n-1} & E(c)^{n-1} \\ E(d)^{n-1} & E(b)^{n-1} \end{bmatrix}_{(u,v)}$$

at coordinates (u,v) while determining the allocation of the components a, b, c, and d to 0 through 3 at random for each 2×2 sub-matrix $S_{(u,v)}^{1}$.

The threshold pattern Sr thus prepared has a large degree of randomness in the distribution of the threshold values and a high spatial frequency as explained in the above stated U.S. patent application Ser. No. 08/382,101. The 'large degree of randomness' implies little periodicity and no substantial bias. The 'high spatial frequency' means that the spatial frequency spectrum obtained by Fourier transform of the threshold pattern takes a high value. The spatial frequency of an image is defined by the number of cycles per unit length (cycles/mm) when each pair of black and white in a black and white stripe pattern corresponds to one cycle of a sine wave. The spatial frequency of the threshold pattern is a similar index.

A concrete procedure of preparing the threshold pattern Sr is described in detail in the above-mentioned U.S. patent application Ser. No. 08/382,101, the disclosure of which is herein incorporated by reference.

The second threshold pattern TP2 is calculated from the multi-tone, large-sized threshold pattern Sr according to the following equation:

$$TP2 = \text{INT}\left(\frac{Sr \times N}{Nr - 1}\right) \quad (1)$$

wherein N denotes the number of interpolating tones (N=4 in the example of FIG. 4); Nr denotes the number of threshold elements constituting the threshold pattern Sr (Nr=256 in the example of FIG. 11); and an operator INT( ) denotes an arithmetic operation of rounding the value in brackets to an integer (omitting the figures below the decimal). Replacement of the denominator in the operator INT( ) by Nr gives the same result. The arithmetic operation of the above Equation implies the process of dividing the threshold values in the multi-tone, large-sized threshold pattern Sr into N equal parts in the order of magnitude and converting the N parts to the integers of 0 to (N–1). For example, among the threshold values in the range of 0 to 254 in the threshold pattern Sr shown in FIG. 11, Sr=0 through 63 is converted to TP2=0, Sr=64 through 127 to TP2=1, Sr=128 through 191 to TP2=2, and Sr=192 through 254 to TP2=3, respectively.

Figure 12:
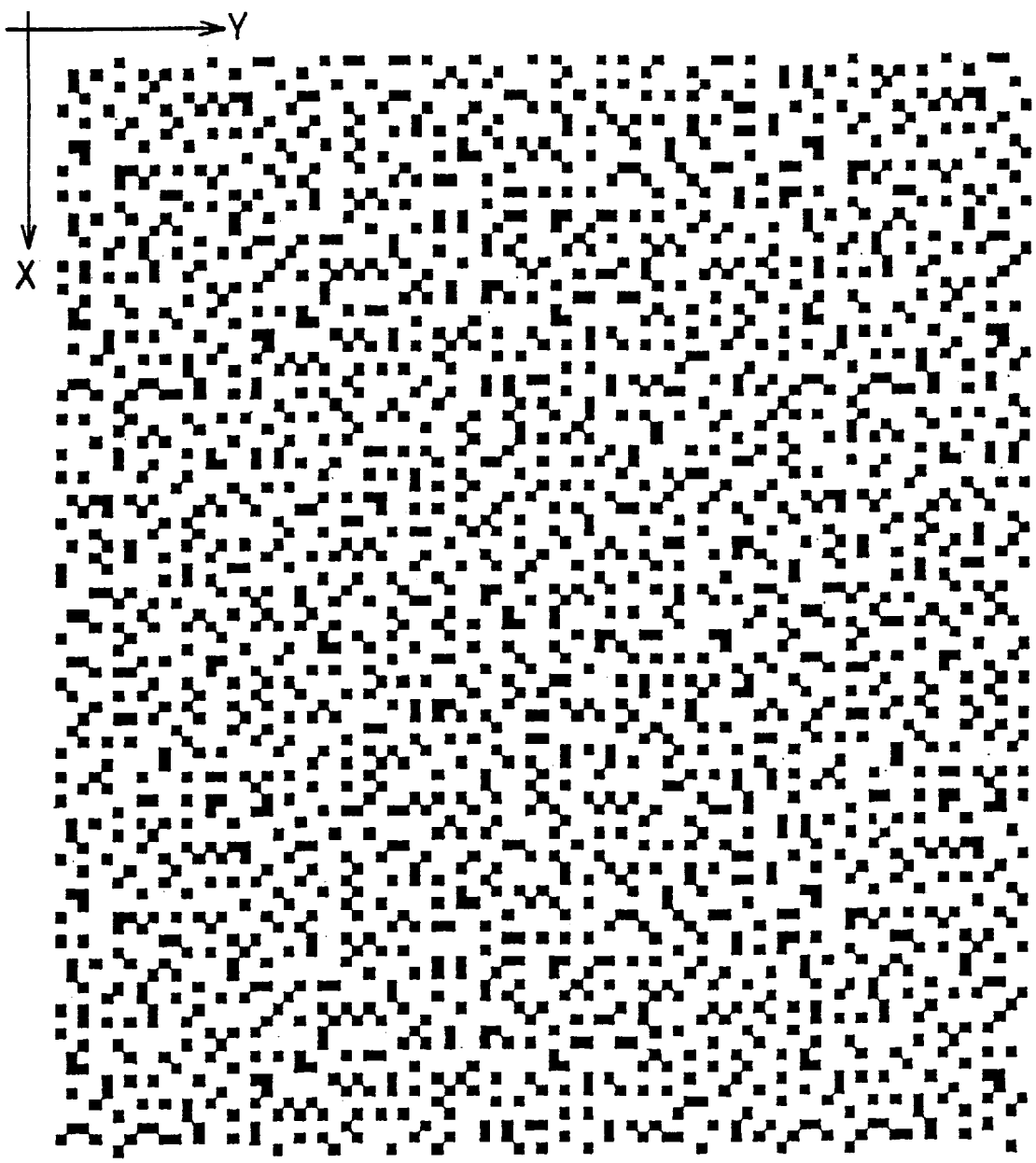
FIG. 12 shows a lit-up pattern based on the multi-tone, large-sized threshold pattern Sr.
Figure 13:
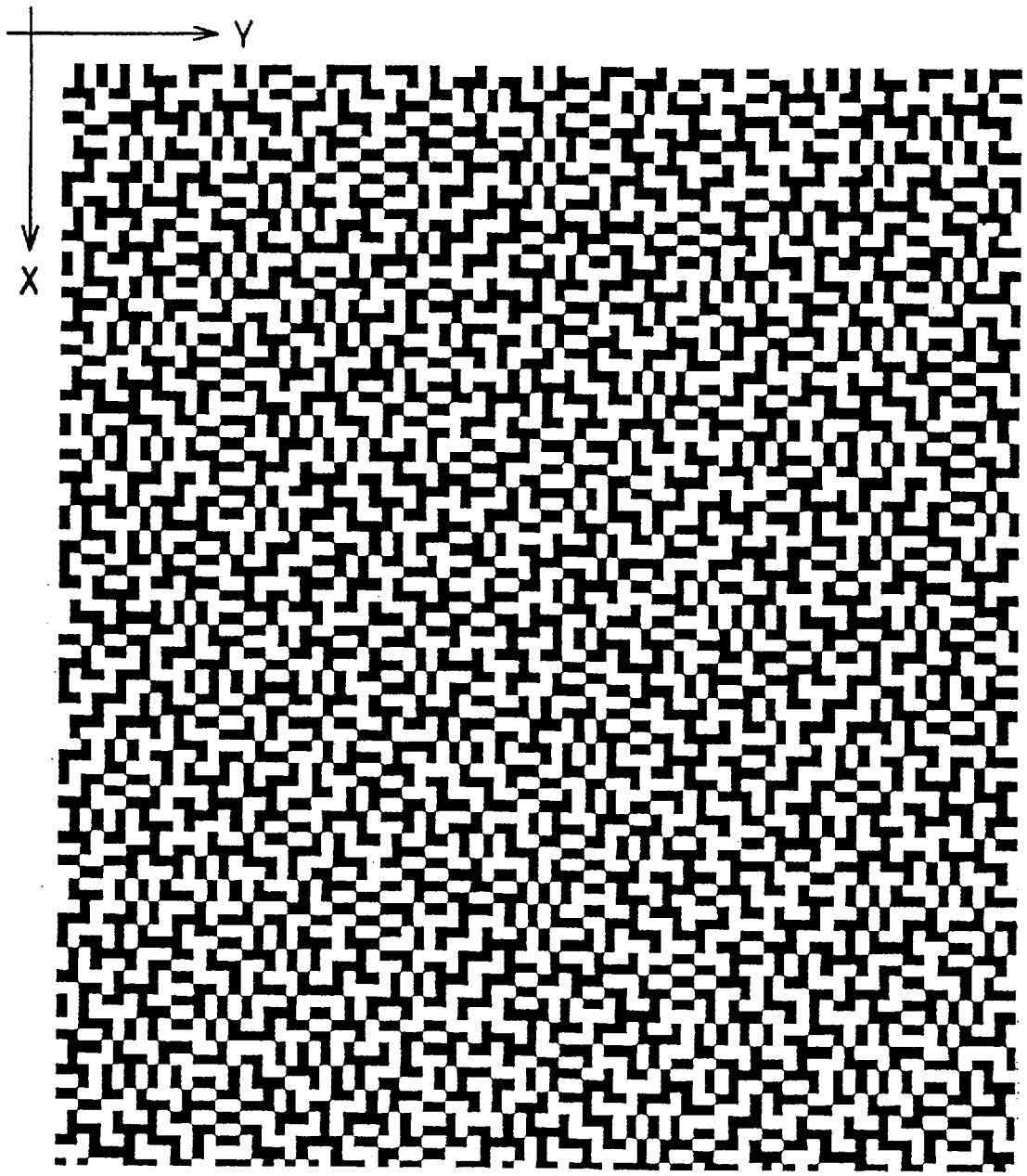
FIG. 13 shows another lit-up pattern based on the multi-tone, large-sized threshold pattern Sr.
Figure 14:
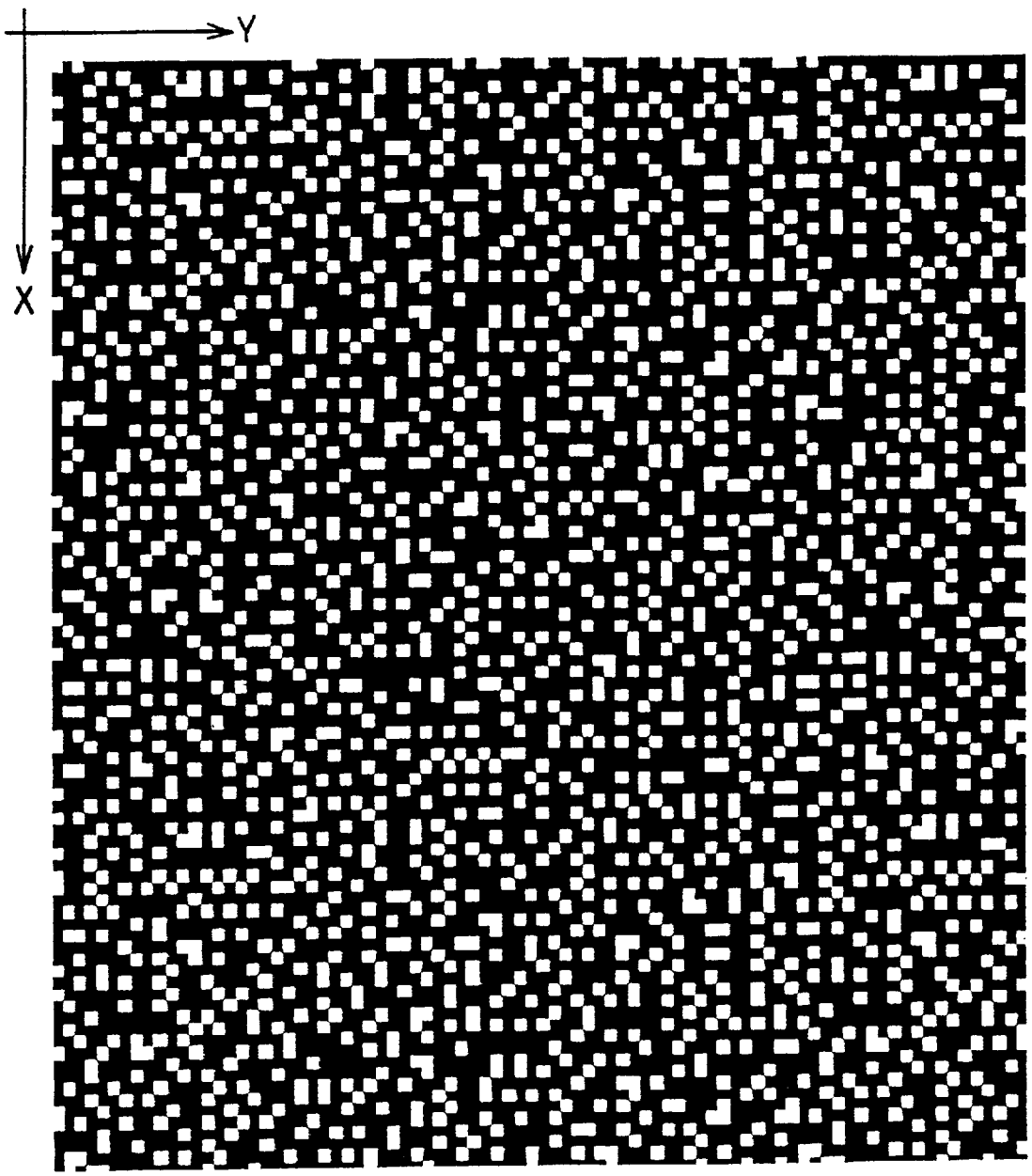
FIG. 14 shows still another lit-up pattern based on the multi-tone, large-sized threshold pattern Sr.

The threshold pattern of FIG. 4 shows the result obtained by converting the threshold pattern Sr of FIG. 11 in this manner. Since the threshold pattern Sr of FIG. 11 has a large degree of randomness and a high spatial frequency, the second threshold pattern TP2 obtained according to the above Equation also has a large degree of randomness and a high spatial frequency. These characteristics are clearly seen in the lit-up patterns of FIGS. 12 through 14. FIGS. 12 through 14 show lit-up patterns, wherein lighting or non-lighting of each pixel is determined by comparing the threshold pattern Sr directly with the image signal Im. FIG. 12 shows the case in which Im is constant at 64 and the area rate of the lit-up pixels is 25%. FIG. 13 shows the case in which Im is constant at 128 and the area rate of the lit-up pixels is 50%. FIG. 14 shows the case in which Im is constant at 192 and the area a rate of the lit-up pixels is 75%. As can be understood from the second threshold pattern TP2 shown in FIG. 4, the lit-up pattern of FIG. 12 having a area rate of 25% is equivalent to the distribution of TP2=0; the lit-up pattern of FIG. 13 having an area rate of 50% is equivalent to the sum of the distributions of TP2=0 and 1; and the lit-up pattern of FIG. 14 having an area rate of 75% is equivalent to the sum of the distributions of TP2=0, 1, and 2. It is clearly understood that the black and white patterns of FIGS. 12 through 14 show distributions having a large number of black-and-white cycles per unit length and thereby a high spatial frequency.

As discussed previously, the second threshold pattern TP2 is formed by providing the multi-tone, large-sized threshold pattern Sr having a large degree of randomness and a high spatial frequency and converting the threshold values in the threshold pattern Sr to N pieces of converted threshold values of 0 to (N–1). This procedure enhances the spatial frequency of the second threshold pattern TP2. Since the third threshold pattern TP3 (see FIG. 6) includes the components of the second threshold pattern TP2 and thereby has an appropriate degree of randomness and an appropriate spatial frequency. The dot signals Sd obtained by comparing the third threshold pattern TP3 with the image signal Im will produce a halftone image that has smooth tone reproducibility without any unevenness.

The range of the threshold values (0 to 254) in the multi-tone, large-sized threshold pattern Sr shown in FIG. 11 does not have any direct relation to the range of the threshold values in the third threshold pattern TP3, but it may be set arbitrarily. It is, however, preferable that the range of the threshold values in the multi-tone, large-sized threshold pattern Sr is set greater than the range of the threshold values in the third threshold pattern TP3.

The second threshold pattern TP2 can be defined as 'a neighborhood-convergence type of a threshold pattern having N pieces of threshold elements, wherein threshold values vary in the respective pixels (that is, no identical threshold values are located side by side in either X direction or Y direction), and all the N pieces of threshold elements appear together in a predetermined small area. The multi-tone, large-sized threshold pattern Sr may be any threshold pattern that can be converted to N pieces of threshold values of 0 to (N−1) so as to generate such a second threshold pattern TP2.

C. First Embodiment

Figure 15:
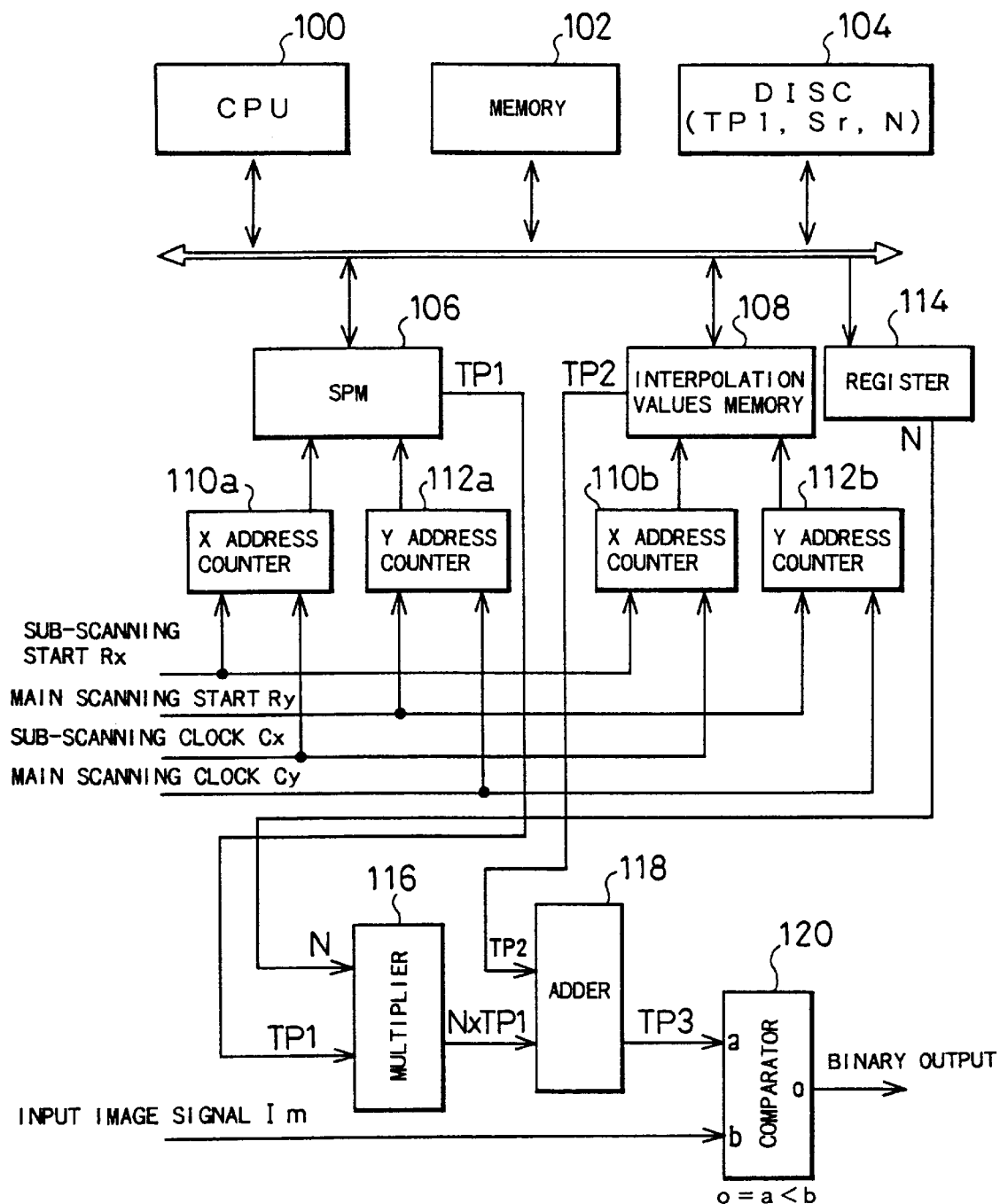
FIG. 15 is a block diagram illustrating the structure of a dot generator as a first embodiment.

FIG. 15 is a block diagram illustrating the structure of a dot generator as a first embodiment of the present invention. The dot generator includes a CPU 100, a main memory 102 having ROM and RAM, a floppy disk drive 104, an Screen Pattern Memory (SPM) 106, an interpolation values memory 108, two sub-scanning address counters 110a and 110b, two main scanning address counters 112a and 112b, an interpolating number register 114, a multiplier 116, an adder 118, and a comparator 120. The dot generator further includes an exposure device (not shown) for recording a halftone image on a recording medium using a light beam.

The SPM 106 stores the first threshold pattern TP1, whereas the interpolation values memory 108 stores the second threshold pattern TP2. The area of each threshold pattern is hereinafter referred to as 'unit block'. This name originates from the fact that the threshold pattern is allocated repeatedly on an image plane like tiles or blocks in the process of generating a halftone image.

The sub-scanning address counter 110a receives a sub-scanning start signal Rx and a sub-scanning clock signal Cx. The sub-scanning start signal Rx generates one pulse every time when a sub-scanning coordinate of a light beam is reset to an initial position. The sub-scanning clock signal Cx generates one pulse every time when the sub-scanning coordinate of the light beam is updated. The sub-scanning address counter 110a generates the sub-scanning coordinate of the light beam within the unit block of the first threshold pattern TP1 in response to these signals Rx and Cx and supplies the sub-scanning coordinate as a sub-scanning address to the SPM 106. In a similar manner, the main scanning address counter 112a generates a main scanning coordinate of the light beam within the unit block of the first threshold pattern TP1 in response to a main scanning start signal Ry and a main scanning clock signal Cy and supplies the main scanning coordinate as a main scanning address to the SPM 106. In response to the addresses given from these two address counters 110a and 112a, one threshold value is read from the SPM 106, and is subsequently supplied to the multiplier 116. In a similar manner, one threshold value is read from the interpolation values memory 108 in response to addresses given from the two address counters 110b and 112b, and is subsequently supplied to the adder 118.

The multiplier 116 multiplies the threshold value TP1 supplied from the SPM 106 by the number of interpolating tones N output from the interpolating number register 114, and supplies the result of the multiplication (N×TP1) to the adder 118. The adder 118 adds the result of the multiplication (N×TP1) and the threshold value TP2 supplied from the interpolation values memory 108. The sum corresponds to the third threshold value TP3 shown in FIG. 1.

The comparator 120 compares the threshold value TP3 with the input image signal Im and generates a binary output, or a dot signal, according to the result of the comparison.

The exposure device (not shown) exposes a photosensitive recording medium such as a photosensitive film to the light beam in response to the binary outputs, to thereby record a halftone image on the recording medium. A multi-color print is obtained by preparing halftone images of the respective color separations Y, M, C, and K and printing these halftone images one over another with the respective inks.

The SPM 106, the X address counter 110a, and the Y address counter 112a shown in FIG. 15 achieves the function of the first threshold value generator 30 shown in FIG. 1. The interpolation values memory 108, the X address counter 110b, and the Y address counter 112b in FIG. 15 achieves the function of the second threshold value generator 32 in FIG. 1.

Figure 16:
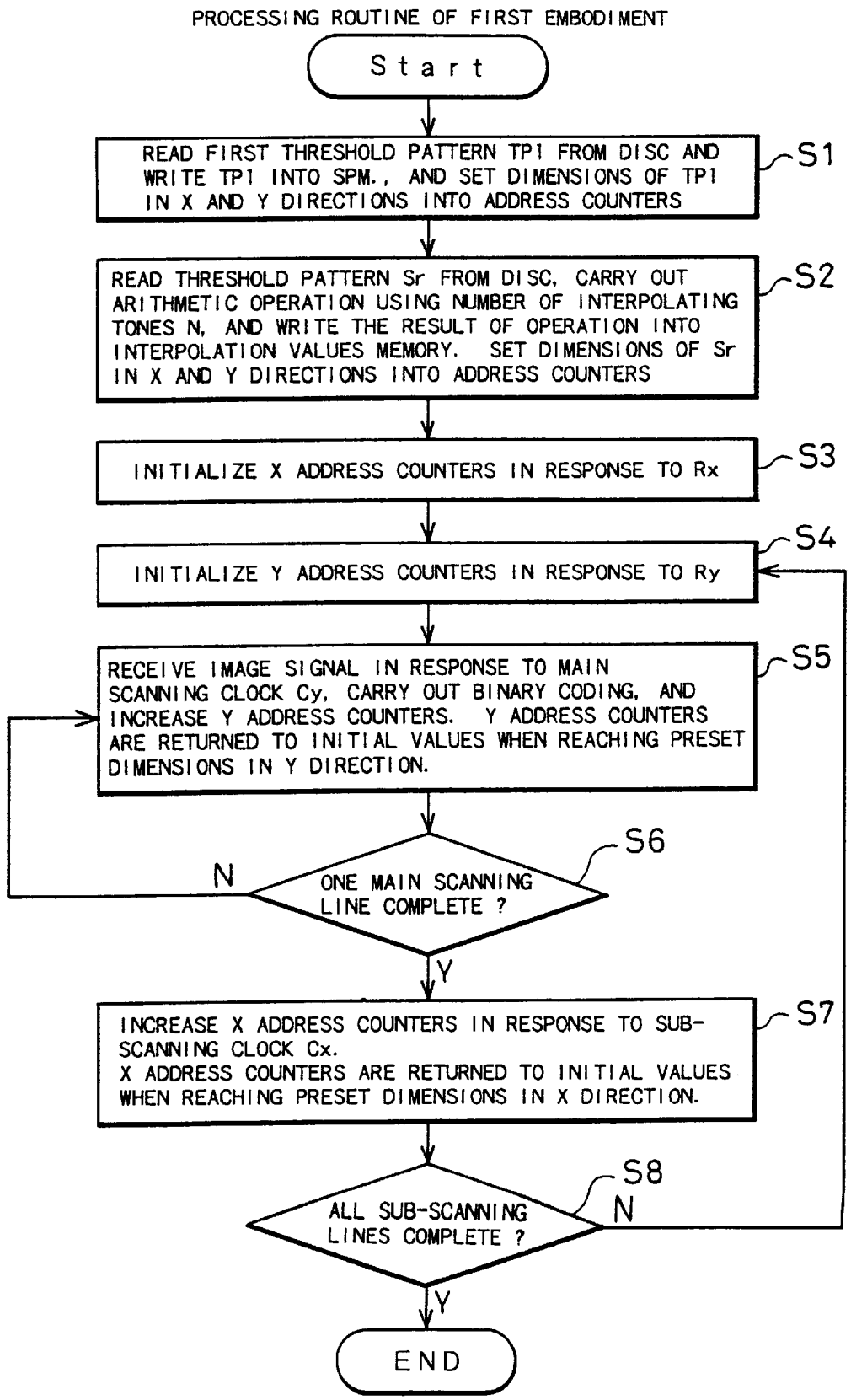
FIG. 16 is a flowchart showing a processing routine executed in the first embodiment.

FIG. 16 is a flowchart showing an operation of the dot generator shown in FIG. 15. At step S1, the CPU 100 reads the first threshold pattern TP1 (FIG. 2) from the floppy disk drive 104 and writes the first threshold pattern TP1 into the SPM 106, while setting the dimensions of the first threshold pattern TP1 in the X- and Y-address counters 110a and 112a, respectively.

At step S2, the CPU 100 reads the multi-tone, large-sized threshold pattern Sr (FIG. 11) from the floppy disk drive 104 and carries out the arithmetic operation defined by the above Equation (1) using the number of interpolating tones N, so as to generate the second threshold pattern TP2 (FIG. 4). The second threshold pattern TP2 is written into the interpolation values memory 108. The second threshold pattern TP2 may also be referred to as 'interpolating values'. The number of interpolating tones N used in the arithmetic operation is stored in the interpolating number register 114. The CPU 100 also sets the dimensions of the second threshold pattern TP2 in the X- and Y-address counters 110b and 112b at step S2, respectively.

The X address counters 110a and 110b are initialized in response to the sub-scanning start signal Rx at step S3. The Y address counters 112a and 112b are initialized in response to the main scanning start signal Ry at step S4.

At subsequent step S5, the comparator 120 receives the image signal Im and carries out binary coding in synchronism with the main scanning clock signal Cy. At the same time, the Y address counters 112a and 112b are increased by one. The Y address counters are reset to the initial values when the respective counts reach the preset dimensions of the patterns TP1 and TP2 in the Y direction. It is then determined at step S6 whether or not the binary coding process has been completed for one main scanning line. Namely it is determined whether or not a pulse of the sub-scanning clock signal Cx has been generated. When the binary coding process has not been completed for one main scanning line, the process returns from step S6 to step S5. When complete, on the other hand, the process proceeds to step S7. At step S7, the X address counters 110a and 110b are increased in response to the sub-scanning clock signal Cx. The X address counters 110a and 110b are reset to the initial values when the respective counts reach the preset dimensions of the patterns TP1 and TP2 in the X direction. It is then determined at step S8 whether or not the binary coding process has been completed for all the sub-scanning lines. When not completed, the process returns from step S8 to step S4. Repetition of the processing of steps S4 through S8 generates binary outputs or dot signals representing one halftone image.

D. Second Embodiment

Figure 17:
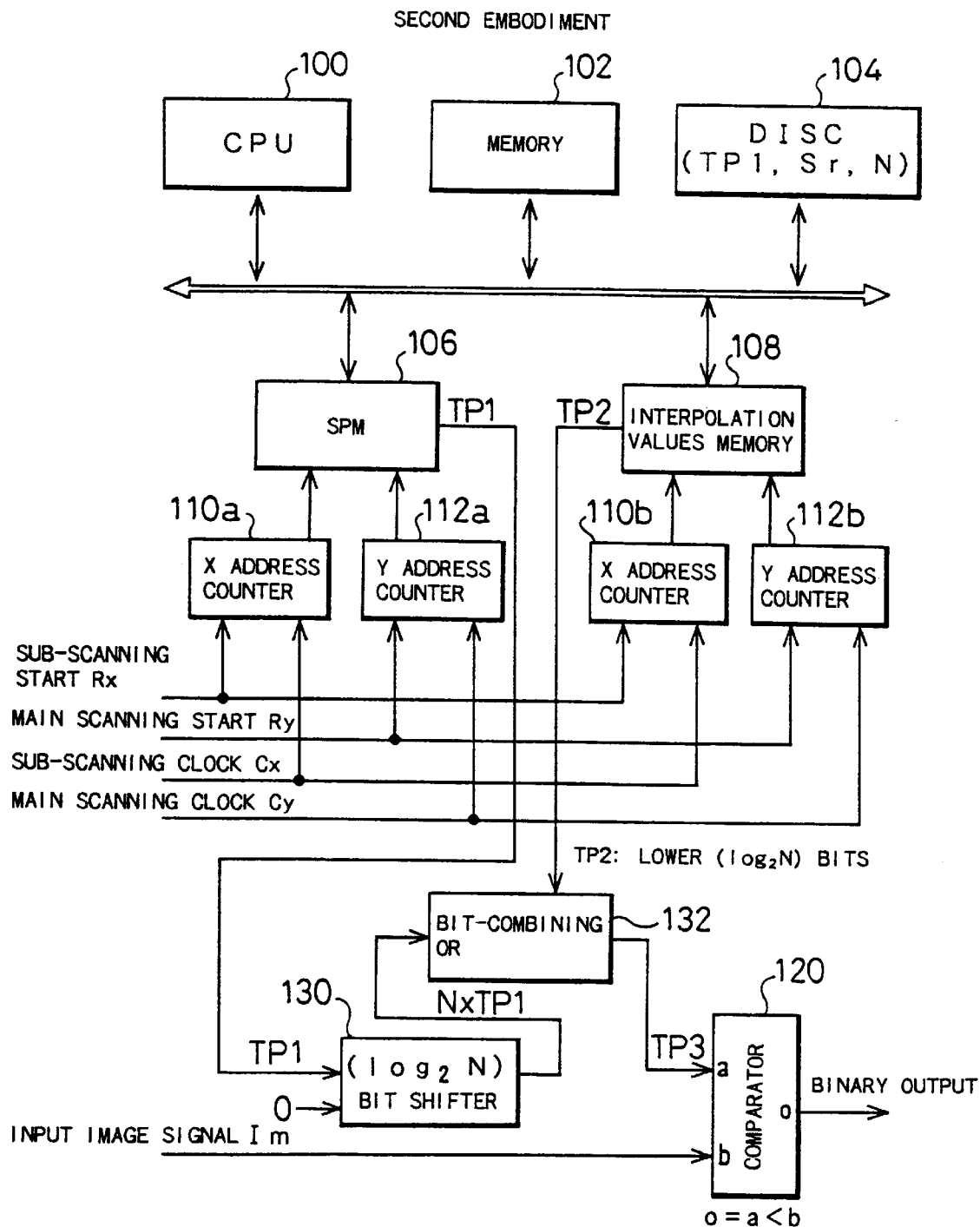
FIG. 17 is a block diagram illustrating the structure of another dot generator as a second embodiment.

FIG. 17 is a block diagram illustrating the structure of another dot generator as a second embodiment of the invention. The dot generator of the second embodiment has a similar structure to that of the dot generator of the first embodiment shown in FIG. 15, except that the multiplier 116 is replaced by a bit shifter 130, and the adder 118 is replaced by a bit-combining OR circuit 132. The interpolating number register 114 shown in FIG. 15 is omitted from the dot generator of FIG. 17, although the omission is not essential. In case that the dot generator includes the interpolating number register 114, the number of interpolating tones N is supplied from this register 114 to the bit shifter 130 and the bit-combining OR circuit 132.

The dot generator of FIG. 17 is a simplified apparatus applicable to the case in which the number of interpolating tones N is a power of 2. When N is equal to $2^n$, the bit shifter 130 shifts the first threshold pattern TP1 leftward by $\log_2 N$ (=n) bits. This gives the same result as that of the multiplier 116 shown in FIG. 15. The bit-combining OR circuit 132 calculates the OR (logical sum) of the lower $\log_2 N$ (=n) bits of the second threshold pattern TP2 and the output of the bit shifter 130 with respect to each bit. This gives the same result as that of the adder 118 shown in FIG. 15.

E. Third Embodiment

Figure 18:
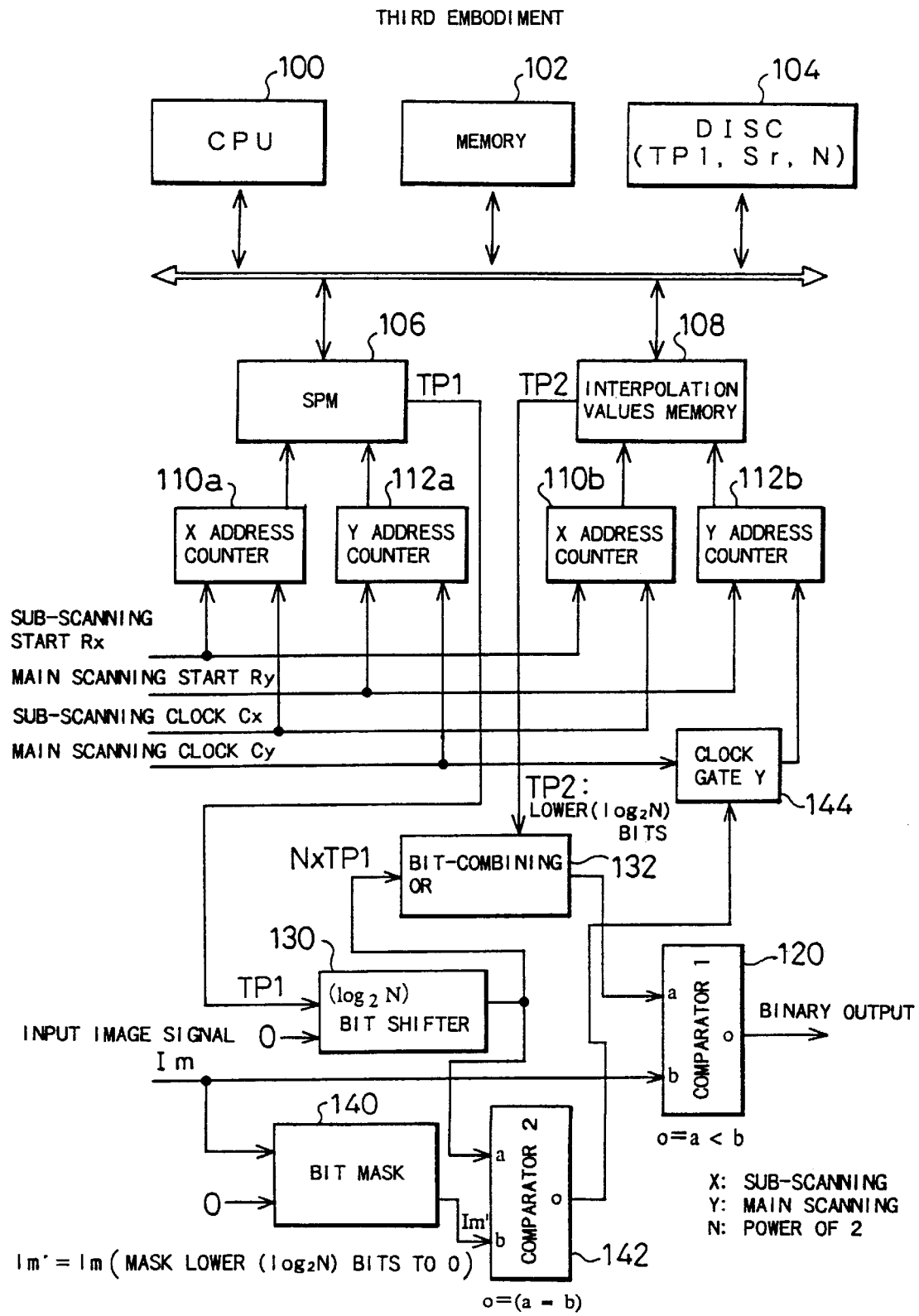
FIG. 18 is a block diagram illustrating the structure of still another dot generator as a third embodiment.

FIG. 18 is a block diagram illustrating the structure of still another dot generator as a third embodiment of the present invention. The dot generator of the third embodiment includes a bit mask 140, a second comparator 142, and a clock gate 144 in addition to the elements of the dot generator of the second embodiment shown in FIG. 17. In the dot generator of the third embodiment, the clock gate 144 regulates the process of updating the address in the Y direction in the interpolation values memory 108.

The bit mask 140 is a circuit for masking the lower $\log_2 N$ bits of the image signal Im to zero. For example, when N=4, the lower 2 bits are masked. The second comparator 142 compares a masked image signal Im' with the output (N×TP1) of the bit shifter 130. In case that the output (N×TP1) of the bit shifter 130 becomes equal to the masked image signal Im', the clock gate 144 is open for a time period corresponding to one clock. By way of example, it is assumed that the masked image signal Im' is equal to 96 and the number of interpolating tones N is equal to 4. The output (N×TP1) of the bit shifter 130 is equal to 96 at the position of TP1=24; that is, the threshold value at the position (X1,Y2) in FIG. 2. When the binary coding process is carried out on a main scanning line having the sub-scanning coordinate of X1, the clock gate 144 opens to update the Y address of the second threshold pattern TP2 every time when this position (X1,Y2) is referred to, that is, at every 8 pixels. On a main scanning line having the sub-scanning coordinate other than X1, on the other hand, Im' is not equal to (N×TP1). Accordingly, the initial threshold values on each scanning line, which is the threshold value having the Y coordinate equal to Y0 in FIG. 4, is used over the whole length of each scanning line.

Figure 19:
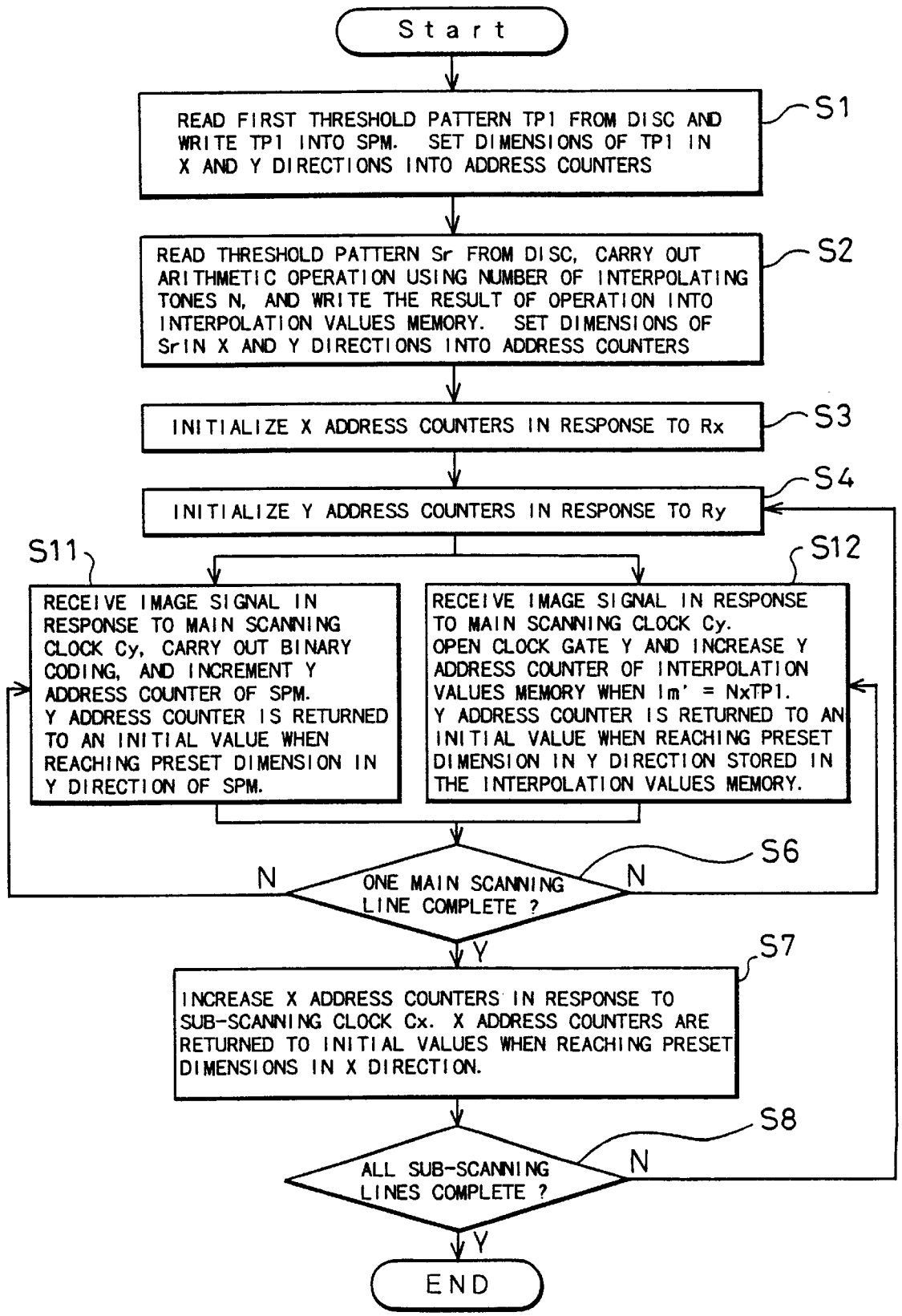
FIG. 19 is a flowchart showing a processing routine executed in the third embodiment.

FIG. 19 is a flowchart showing a processing routine executed in the third embodiment. The processing routine of the third embodiment includes steps S11 and S12 in place of step S5 in the processing routine of the first embodiment shown in FIG. 16.

At step S11, the first comparator 120 receives the image signal Im and carries out binary coding of the input image signal Im in synchronism with the main scanning clock signal Cy. At the same time, the Y address counter 112a for the SPM 106 is increased. The Y address counter 112a is returned to an initial value when the count reaches the preset dimension of the first threshold pattern TP1 in the Y direction.

At step S12, the second comparator 142 receives the image signal Im and compares the masked image signal Im' with the output (N×TP1) of the bit shifter 130 in synchronism with the main scanning clock signal Cy. When Im'= N×TP1, the clock gate 144 opens to increase the Y address counter 112b for the interpolation values memory 108. The Y address counter 112b is returned to an initial value when the count reaches the preset dimension of the second threshold pattern TP2 in the Y direction.

The timing to open the clock gate 144 is not restricted to that of the above third embodiment. For example, the clock gate 144 may be open every time when the main scanning clock Cy produces the number of pulses which is equal to the dimension of the first threshold pattern TP1 in the Y direction (at every 8 pixels in the example of FIG. 2), irrespective of the value of the input image signal Im. In this case, the position of referring to the second threshold pattern TP2 is updated every time the first threshold pattern TP1 is referred to over its dimension in the Y direction. In other words, the position-to-be-referred of the second threshold pattern TP2 is not required to be updated at the same time when the position-to-be-referred of the first threshold pattern TP1 is updated, but can be updated according to any desired timing. This will sometimes help to generate a favorable halftone image over a wider image area than the size of the second threshold pattern TP2.

F. Fourth Embodiment

Figure 20:
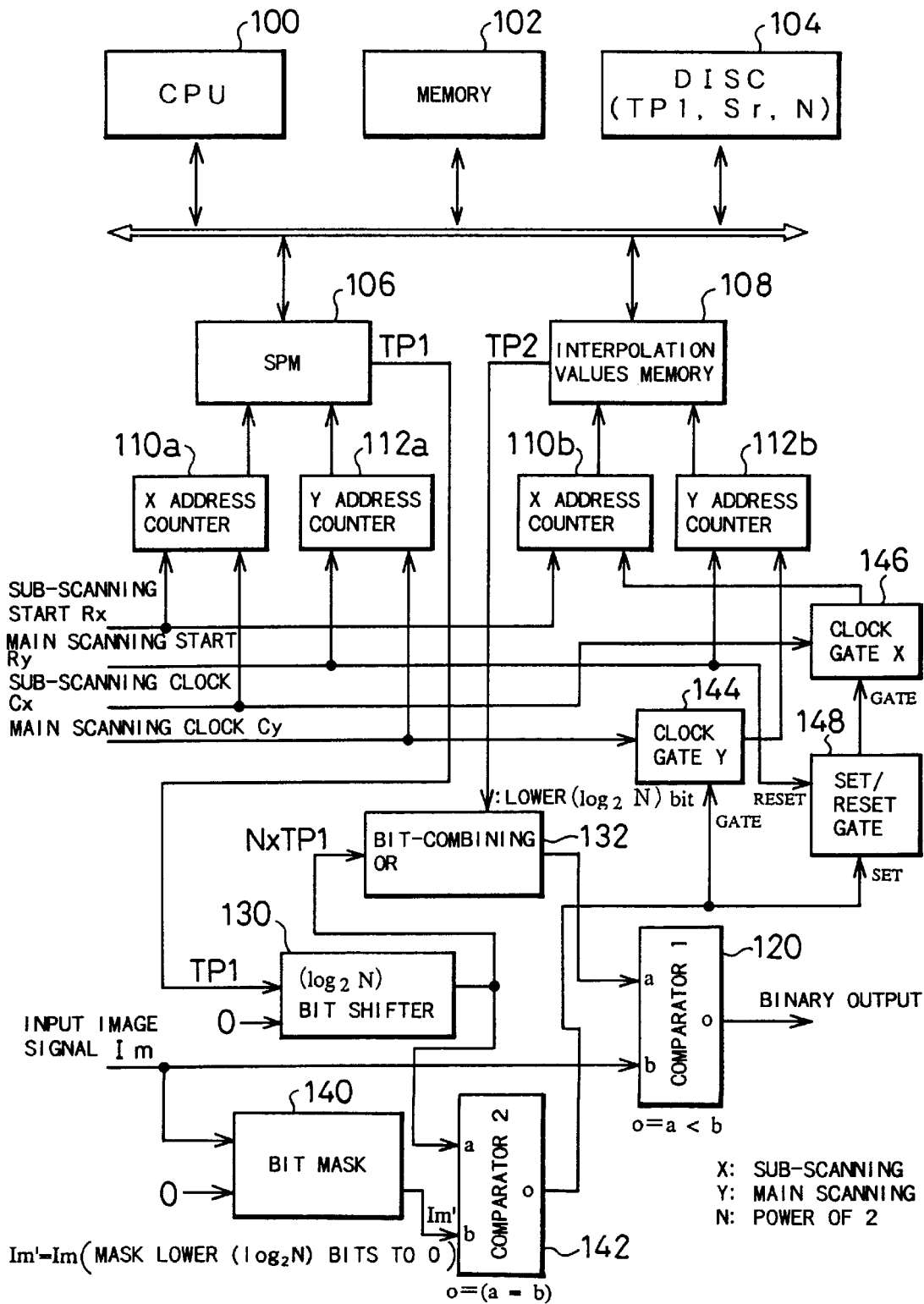
FIG. 20 is a block diagram illustrating the structure of another dot generator as a fourth embodiment.

FIG. 20 is a block diagram illustrating the structure of another dot generator as a fourth embodiment of the present invention. The dot generator of the fourth embodiment includes a clock gate 146 in the X direction and a set/reset gate 148, in addition to the elements of the dot generator of the third embodiment shown in FIG. 18. In the dot generator of the fourth embodiment, the two clock gates 144 and 146 regulate the updating of the Y- and X-addresses for the interpolation values memory 108.

The additional clock gate 146 in the X direction is open in response to a signal given from the set/reset gate 148 when the set/reset gate 148 is in the set position. The set/reset gate 148 is set when the output (N×TP1) of the bit shifter 130 becomes equal to the masked image signal Im', and is reset when the main scanning start signal Ry is given. The clock gate 146 in the X direction is accordingly open only when the output (N×TP1) of the bit shifter 130 becomes equal to the masked image signal Im'. As discussed in the third embodiment, when Im'=N×TP1, the clock gate 144 in the Y direction opens to increase the address counter 112b. At the same time, the clock gate 146 in the X direction opens. Generation of one pulse of the sub-scanning clock signal Cx after the opening of the clock gate 146 increases the X address counter 110b. In other words, the X address counter 110b for the second threshold pattern TP2 is updated in response to the sub-scanning clock signal Cx only when the address counter 112b is updated at least once before the clock signal Cx produces one pulse. The X address counter 110b is kept at a fixed value until the Y address counter 112b is updated.

Figure 21:
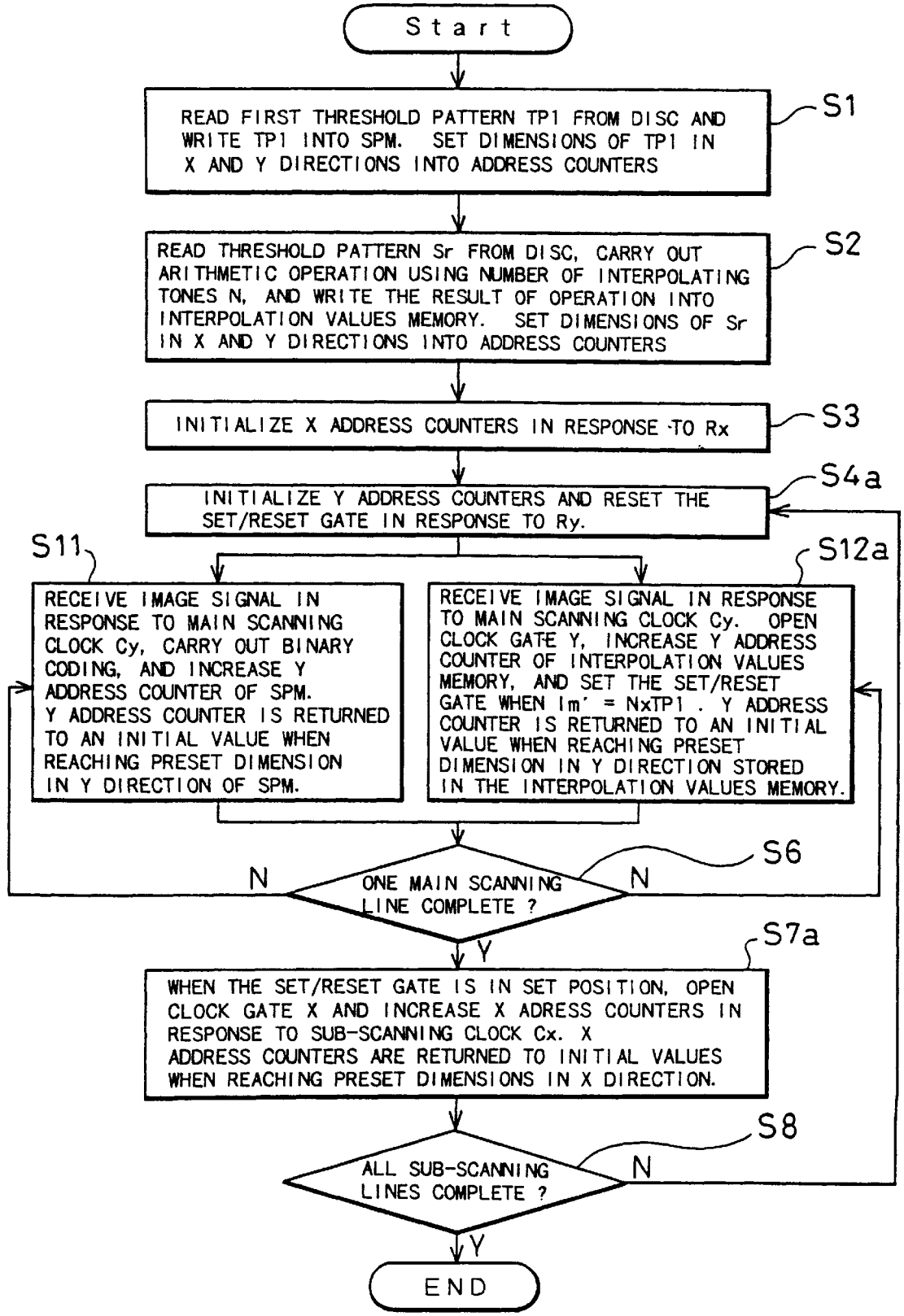
FIG. 21 is a flowchart showing a processing routine executed in the fourth embodiment.

FIG. 21 is a flowchart showing a processing routine executed in the fourth embodiment. The processing routine of the fourth embodiment includes steps S4a, S7a, and S12a in place of steps S4, S7, and S12 in the processing routine of the third embodiment shown in FIG. 19.

At step S4a, the Y address counters 112a and 112b are initialized and the set/reset gate 148 is reset in response to the main scanning start signal Ry. At step S12a, the Y address counter 112b is increased while the set/reset gate 148 is set. At step S7a, the clock gate 146 in the X direction opens to increase the X address counter 110b only when the set/reset gate 148 is in the set position.

Figure 22:
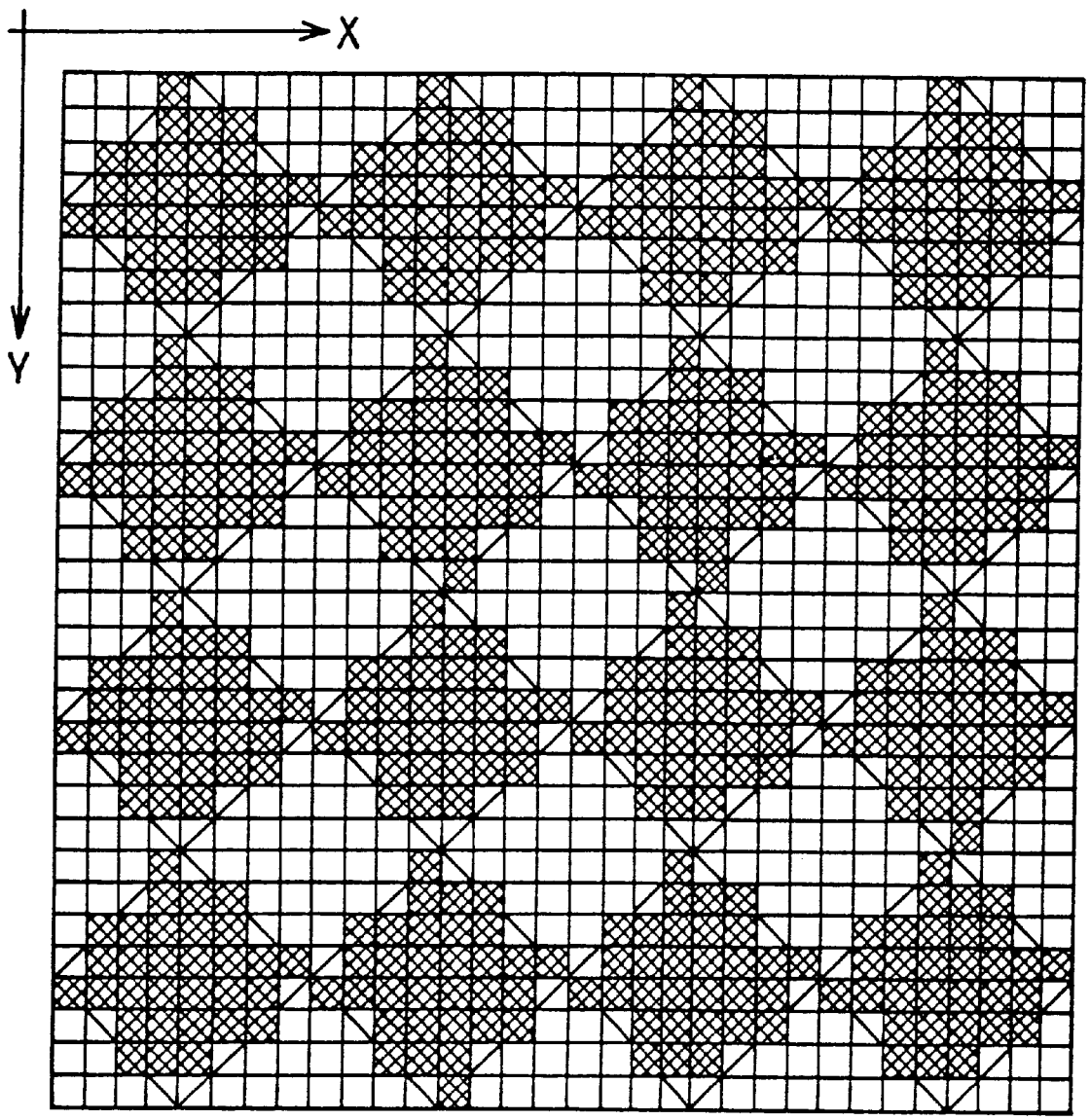
FIG. 22 shows an example of halftone dots generated in the fourth embodiment.

FIG. 22 shows an example of halftone dots generated in the fourth embodiment and corresponds to FIG. 8 of the first embodiment. Comparison between FIG. 22 and FIG. 8 shows that the lit-up pixels in the halftone image of FIG. 22 are more scattered than those in the halftone image of FIG. 8. This means that the fourth embodiment may reproduce the tones more smoothly as a whole then the first embodiment.

In the above embodiments, the arithmetic operation is carried out to calculate the second threshold pattern TP2 from the more-tone, large-scaled threshold pattern Sr according to the number of interpolating tones N. In accordance with another possible procedure, plural sets of second threshold patterns TP2 are prepared in advance with respect to plural numbers of interpolating tones N, and one of the plural sets of the second threshold pattern TP2 may be selected according to the number of interpolating tones N to be used.

Although the first threshold pattern TP1 and the second threshold pattern TP2 are stored respectively in the threshold values memories 106 and 108, an operation unit, such as the CPU 100, may generate the first threshold pattern TP1 and the second threshold pattern TP2 by carrying out a processing program to generate the same.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating halftone dots as a function of an image signal, said method comprising the steps of:

(a) providing a first threshold value constituting a first threshold pattern that is to reproduce a relatively large number of tones and is relatively small in size;

(b) providing a second threshold value constituting a second threshold pattern that is to reproduce a relatively small number of tones and is relatively large in size;

(c) carrying out an arithmetic operation of said first threshold value and said second threshold value, to thereby generate a third threshold value; and (d) comparing said third threshold value with said image signal, to thereby generate a dot signal representing a halftone dot.

2. A method in accordance with claim 1, wherein said step (c) comprises the step of:

carrying out an interpolating operation to interpolate said first threshold value with said second threshold value.

3. A method in accordance with claim 2, wherein said step of carrying out an interpolating comprises the steps of:

multiplying said first threshold value by an integer N; and adding the result of said multiplication and said second threshold value to generate said third threshold value.

4. A method in accordance with claim 3, wherein said second threshold pattern consists of N pieces of threshold elements of 0 to (N−1).

5. A method in accordance with claim 1, wherein said second threshold pattern is obtained by arranging at random a plurality of different two-dimensional matrices each including an identical set of threshold elements which are arranged in different ways.

6. A method in accordance with claim 5, wherein said integer N is equal to 4, and each said two-dimensional matrix is a 2×2 matrix comprising four threshold elements of 0 to 3.

7. A method in accordance with claim 6, wherein the threshold elements 0 and 1 are arranged diagonally and the threshold elements 2 and 3 are also arranged diagonally in each said 2×2 matrix.

8. An apparatus for generating halftone dots as a function of an image signal, said apparatus comprising:

means for providing a first threshold value constituting a first threshold pattern that is to reproduce a relatively large number of tones and is relatively small in size;

means for providing a second threshold value constituting a second threshold pattern that is to reproduce a relatively small number of tones and is relatively large in size;

operation means for carrying out an arithmetic operation of said first threshold value and said second threshold value, to thereby generate a third threshold value; and a comparator for comparing said third threshold value with said image signal, to thereby generate a dot signal representing a halftone dot.

9. An apparatus in accordance with claim 8, wherein said means for providing a first threshold value comprises a first memory storing said first threshold pattern, and said means providing a second threshold value comprises a second memory storing said second threshold pattern.

10. An apparatus in accordance with claim 8, wherein said operation means comprises:

interpolation means for carrying out an interpolating operation to interpolate said first threshold value with said second threshold value.

11. An apparatus in accordance with claim 10, wherein said interpolation means comprises:

a multiplier for multiplying said first threshold value by an integer N; and an adder for adding the result of said multiplication and said second threshold value to generate said third threshold value.

12. An apparatus in accordance with claim 11, wherein said second threshold pattern consists of N pieces of threshold elements of 0 to (N−1).

13. An apparatus in accordance with claim 8, wherein said second threshold pattern is obtained by arranging at random a plurality of different two-dimensional matrices each including an identical set of threshold elements which are arranged in different ways.

14. An apparatus in accordance with claim 13, wherein said integer N is equal to 4, and each said two-dimensional matrix is a 2×2 matrix comprising four threshold elements of 0 to 3.

15. An apparatus in accordance with claim 14, wherein the threshold elements 0 and 1 are arranged diagonally and the threshold elements 2 and 3 are also arranged diagonally in each said 2×2 matrix.

16. A computer program product comprising a computer readable medium and computer program code means stored on said computer readable medium, for generating halftone dots as a function of an image signal, said program code means comprising:

program code means for causing a computer to provide a first threshold value constituting a first threshold pattern that is to reproduce a relatively large number of tones and is relatively small in size;

program code means for causing the computer to provide a second threshold value constituting a second threshold pattern that is to reproduce a relatively small number of tones and is relatively large in size;

program code means for causing the computer to carry out an arithmetic operation of said first threshold value and said second threshold value, to thereby generate a third threshold value; and program code means for causing the computer to compare said third threshold value with said image signal, to thereby generate a dot signal representing a halftone dot.

* * * * *